US012347896B2

(12) United States Patent
Legg

(10) Patent No.: US 12,347,896 B2
(45) Date of Patent: Jul. 1, 2025

(54) PUMPED TWO-PHASE FUEL CELL COOLING

(71) Applicant: ZEROAVIA LTD, Cirencester (GB)

(72) Inventor: Matthew Legg, Cirencester (GB)

(73) Assignee: ZEROAVIA LTD, Cirencester (GB)

( * ) Notice: Subject to any disclaimer, the term of this patent is extended or adjusted under 35 U.S.C. 154(b) by 0 days.

(21) Appl. No.: 18/873,477

(22) PCT Filed: Jun. 12, 2023

(86) PCT No.: PCT/US2023/025062
§ 371 (c)(1),
(2) Date: Dec. 10, 2024

(87) PCT Pub. No.: WO2023/239965
PCT Pub. Date: Dec. 14, 2023

(65) Prior Publication Data
US 2025/0174683 A1 May 29, 2025

Related U.S. Application Data

(63) Continuation of application No. 17/806,471, filed on Jun. 10, 2022, now Pat. No. 11,575,138.

(60) Provisional application No. 63/450,874, filed on Mar. 8, 2023.

(30) Foreign Application Priority Data

Oct. 25, 2022 (GB) .................................. 2215788
Apr. 24, 2023 (GB) .................................. 2305991

(51) Int. Cl.
H01M 8/04014 (2016.01)

(52) U.S. Cl.
CPC .... H01M 8/04014 (2013.01); H01M 2250/20 (2013.01)

(58) Field of Classification Search
CPC .................. H01M 8/04014; H01M 2250/20
See application file for complete search history.

(56) References Cited

U.S. PATENT DOCUMENTS

| 6,045,934 A | 4/2000 | Enami |
| 6,468,681 B1 | 10/2002 | Horiguchi |
| 6,866,955 B2 | 3/2005 | Lee et al. |
| 2005/0130003 A1* | 6/2005 | Lee ........................ F28F 3/048 429/444 |
| 2013/0260273 A1* | 10/2013 | Scheibert .......... H01M 8/04059 429/437 |
| 2017/0233111 A1* | 8/2017 | Mata ...................... B64G 1/423 244/171.1 |
| 2017/0256804 A1* | 9/2017 | Miller ............... H01M 8/04753 |
| 2019/0312288 A1* | 10/2019 | Tsubouchi ........ H01M 8/04089 |
| 2021/0075046 A1* | 3/2021 | Taneoka ............ H01M 8/04029 |
| 2022/0009379 A1* | 1/2022 | Mikic .................. B64D 35/023 |
| 2022/0052361 A1* | 2/2022 | Morrison .......... H01M 8/04014 |

OTHER PUBLICATIONS

Meredith, "Aeronautical Research Committee Reports and Memoranda", Air Ministry, London, No. 1683, 1926, 17 pgs.
Whitney et al. "Evaporative Cooling—The Racer's Edge, Part 1: Through WWII", Jan. 3, 2018, found at https://www.enginehistory.org/Accessories/EvapCooling/EvapCooling1.shtml, 6 pgs.
Whitney et al. "Evaporative Cooling—The Racer's Edge, Part 2: Post WWII", Jan. 3, 2018, found at https://www.enginehistory.org/Accessories/EvapCooling/EvapCooling2.shtml, 5 pgs.
Soupremanien, "Two phase flow at small scale—Application to the cooling of a Proton Exchange Membrane Fuel Cell (PEMFC)", Fluids mechanics, Institut Polytechnique de Grenoble, 2010, 323 pgs.
International Search Report and Written Opinion issued in PCT/US2023/025062, dated Apr. 1, 2024, 14 pgs.
Combined Search and Examination Report issued in related GB Appln. Serial No. 2215788.7, dated Dec. 1, 2022, 4 pages.

* cited by examiner

Primary Examiner — Muhammad S Siddiquee
(74) Attorney, Agent, or Firm — HAYES SOLOWAY P.C.

(57) ABSTRACT

A cooling system for a fuel-cell system onboard a vehicle such as an aircraft in one embodiment employs the latent heat of evaporation of a two-phase coolant to reduce mass and parasitic power requirements of the cooling system. In another embodiment the cooling system has a primary ambient air heat exchanger coolant loop for cooling the fuelcell system, and a secondary coolant loop comprising a fluid circuit configured to circulate a coolant in thermal contact with a phase-change material (PCM) in thermal contact with the fuel-cell to absorb heat from the fuel-cell. The secondary coolant loop includes a heat pump for cooling the PCM.

9 Claims, 22 Drawing Sheets

PUMPED TWO-PHASE FUEL CELL COOLING

The present disclosure relates to fuel-cells systems and methods for operating same. The disclosure has particular utility in the creation of high temperature metal composite bipolar plates (BPPs) for high temperature proton exchange membrane (HT-PEM) fuel-cells for use in fuel-cell powered vehicles including aircraft, and will be described in connection with such utility, although other utilities are contemplated including, by way of example, formation of batteries and other electronic devices.

This section provides background information related to the present disclosure which is not necessarily prior art. This section provides a general summary of the disclosure and is not a comprehensive disclosure of its full scope or all its features.

A fuel-cell is an electrochemical cell that converts chemical energy into electrical energy by means of spontaneous electrochemical reduction-oxidation (redox) reactions. Fuel-cells include an anode and a cathode separated by an ionically conductive electrolyte. During operation, a fuel (e.g., hydrogen) is supplied to the anode and an oxidant (e.g., oxygen or air) is supplied to the cathode. The fuel is oxidized at the anode, producing positively charged ions (e.g., hydrogen ions) and electrons. The positively charged ions travel through the electrolyte from the anode to the cathode, while the electrons simultaneously travel from the anode to the cathode outside the cell via an external circuit, which produces an electric current. The oxidant supplied to the cathode is reduced by the electrons arriving from the external circuit and combines with the positively charged ions to form water. The reaction between oxygen and hydrogen is exothermic, generating heat that needs to be removed from the fuel-cell.

Fuel-cells may be used as power sources for electric motors of electric vehicles and hybrid electric vehicles, including aircraft. In such applications, fuel-cells are oftentimes arranged in stacks of multiple cells and connected in a series or parallel arrangement to achieve a desired power and output voltage. Cooling systems for fuel-cell-powered vehicles oftentimes use an airflow generated during movement of the vehicle as a heat transfer medium. For example, an ambient airflow may be directed from outside the vehicle through an air intake of the vehicle and through one or more heat exchangers disposed within the vehicle. An airflow generated in this manner is oftentimes referred to as ram air and, when ram air is used as a cooling medium in a vehicle, the vehicle may experience increased drag, which may reduce the energy efficiency of the vehicle.

Heat management processes such as heat exchangers or coolant media in HT-PEM fuel-cells increase the overall weight and volume of the system. Improvements in cooling efficiency directly impact cost per kW and enable operation at higher altitudes.

Aviation applications require megawatt-range power and lightweight fuel-cell systems with high specific power. Air-cooling in combination with HT-PEM fuel-cells solves the problem of system weight by excluding the heavy heat exchanger and liquid coolant components. However, the limited volumetric thermal capacity of air makes air-cooled fuel-cell stacks scaling problematic.

Temperature gradient is also a problem of powerful air-cooled systems-even given sufficient cooling, the first part of the fuel-cell in communication with the coolant is cooled more than later parts resulting either in a too-hot section at the end, or an oversized cooling system.

FIG. 1 illustrates a prior art integrated hydrogen-electric engine system 10 that can be utilized, for example, in an aircraft turboprop or turbofan system, to provide a streamline to light-weight, power dense and efficient system. Integrated hydrogen-electric engine system 10 includes an elongated shaft 12 that extends through the entire power train of integrated hydrogen-electric engine system 10 to function as a common shaft for the various components of the power train. Elongated shaft 12 supports a propulsor (e.g., a fan or propellor, not shown) and a multi-stage air compressor system 14, in fluid communication with a fuel source, e.g., hydrogen tank 16, a heat exchanger radiator or intercooler 18 in fluid communication with the compressor system 14, a fuel-cell stack 20 in fluid communication with the heat exchanger or intercooler 18, and a motor assembly 22 in electrical communication with fuel-cell stack 20. Intercooler 18 is configured to cool the compressed air received from air compressor system 14 by heat exchange with ambient air.

Referring also to FIG. 1a, fuel-cell stack 20 comprises a plurality of fuel-cells 100. Each fuel-cell 100 includes a Proton Exchange Membrane (PEM) 112, typically formed in a specially treated polymer material that conducts only positive charged ions, and blocks electrons.

Catalyst layers are provided on both sides of the PEM 112—an anode catalyst layer 114 on one side, and a cathode catalyst layer 116 on the other. Gas Diffusion Layers (GDLs) 118, 120 sit to the outside of the catalyst layers 114, 116 and facilitate transport of reactant gases, e.g., hydrogen and oxygen from flow channels 128, 130, into the catalyst layers, as well as removal of reaction product water. The PEM 112, catalyst layers 114, 116 and the GDLs 118, 120 together make up the so-called Membrane Electrode Assembly (MEA) 122. The MEA 122 is the part of the fuel-cell where power is produced.

Each individual MEA 122 produces less than one volt under typical operating condition, but most applications require higher voltages. Therefore, multiple MEAs 122 usually are connected in series by stacking them on top of one other to provide a usable output voltage. Each cell in the stack is sandwiched between two bipolar plates (BPPs) an anode plate 124 and a cathode plate 126 to separate it from neighboring cells. These plates 124, 126, which may be made of metal, carbon, or composites, provide electrical conduction between cells, as well as providing physical strength to the stack. The surfaces of the plates typically contain flow channels 128, 130 machined or stamped into the plates 124, 126 to allow reactant gases to flow over the MEA 122. Such flow channels are provided to distribute reactants over an active area of the fuel-cell thereby maximizing performance and stability. Additional flow channels 132, 134 inside each plate 124, 126 are used to circulate a liquid coolant.

The PEM produces electricity when supplied with reactant fuel, i.e., hydrogen, and oxidizer, i.e., air supplied via compressor 14. The cathode is supplied with compressed air from compressor 14. After compression, typically to 2-3 bar, the cathode reactant air may be cooled by heat exchanger or intercooler 18. After passing through the fuel-cell 20, some of the energy imparted to the air through compression and heating is recovered by expansion through turbine 24.

The operation of the hydrogen-electric engine system 10 is controlled by a regulator or controller 26.

Referring to FIG. 2, another prior art embodiment of an integrated hydrogen-electric engine system, fuel-cell 20 is cooled by passing a coolant, for example ambient air through channels 132, 134 in the fuel-cell 20 (see FIG. 1a).

In fuel-cell-powered aircraft, the power output demanded of the fuel-cells and the amount of waste heat generated by the fuel-cells is greatest during takeoff and climb. 100% power output is only needed for 60-120 seconds on takeoff and initial climb to 1,000 feet. After 1,000 feet, power may be reduced by 20% for the normal climb portion of the flight, and the fuel-cell powerplant typically operates at a higher efficiency, resulting in 30% lower heat output. Waste heat generated during operation of powered aircraft may be dissipated by positioning an air-cooled heat exchanger in an ambient airflow path through the aircraft. However, during takeoff roll (from zero velocity until takeoff speed), and potentially also during initial climb, airflow across the heat exchanger surface is low, which makes the capacity of the heat rejection system lesser during that stage of flight. Moreover, directing ambient air to flow through the aircraft (instead of around the aircraft) when the aircraft is moving creates drag, with the amount of drag experienced by the aircraft being proportional to the volume of ambient air directed through the aircraft (and thus through the heat exchanger), the pressure drop across the heat exchanger and the freestream dynamic pressure. In practice, the volume of the air-cooled heat exchanger (and the volume of air directed through the heat exchanger) may be selected to accommodate the most demanding cooling requirements of the aircraft, which may occur when the aircraft is operating under high load conditions, e.g., during takeoff and climb. However, sizing the heat exchanger in this way may cause the aircraft to experience an unnecessarily large amount of drag when the aircraft is operating under low load conditions, e.g., during cruise, when minimal waste heat dissipation is needed. In addition, when cooling requirements are low, the presence of an oversized heat exchanger onboard the aircraft adds unnecessary weight and bulk to the aircraft and additional components required to prevent overcooling of the fuel-cells. Therefore, a supplemental cooling system covering at least 30% of heat output for 120 seconds would be of significant contribution to the efficiency of hydrogen fuel-cell-powered airplanes.

In accordance with one embodiment of the present disclosure, droplets of water are sprayed into air and direct the water droplets carrying air through the fuel-cell to absorb heat from the fuel-cell. The air and water droplet mixture may be directed through the fuel-cell or mixed with the reactant air and directed through the cathode side of the fuel-cell. The water droplets increase coolant flow thermal capacity by the phase transition effect (droplet evaporation), absorbing heat from the fuel-cell. The water is supplied from a storage tank. A regulator regulates the amount of water sprayed into the coolant air stream. The droplet density and size are optimized so that the same amount of cooling air can reject 3-15 times more heat than air alone while keeping temperature uniform.

More particularly, in accordance with the present disclosure water droplets are mixed with air to form a water-air mixture for cooling for transport through and in contact with a fuel-cell to absorb heat from the fuel-cell.

In one embodiment, ambient air is compressed in a compressor, which raises the temperature of the air. The resulting dry hot compressed air is passed through a heat exchanger (e.g., an intercooler) depending on ambient temperature, required power output, and aircraft elevation, to cool the hot compressed air since excessive incoming air temperature can melt or damage the fuel-cell materials. The fuel-cell is further cooled by a coolant media comprising air containing water droplets supplied to cooling channels of the fuel-cell.

In another embodiment, ambient air is compressed and cooled, and supplied to the cathode, while hydrogen fuel is supplied to the anode. The moist reactant exhaust air from the cathode outlet is cooled and redirected to the cooling channels of the same fuel-cell or fuel-cell stack. Before re-entering the fuel-cell as coolant media, the air may be sprayed with a stream of liquid water droplets to form a water-air mixture.

In accordance with another embodiment, liquid water, both injected and produced by the fuel-cell, is sprayed as water droplets into the cooling air flow. The water droplets absorb heat from the airflow and change phase into water vapor. The phase transition of the water droplets or moisture in the air absorbs part of the heat from the airflow, reducing and stabilizing its temperature, while air contacts with the fuel-cell and absorbs heat from cooling channel walls of the fuel-cell. As a result, the water-air mixture functions as a highly effective coolant, cooling the fuel-cell. Due to the high specific vaporization heat of water the water droplets absorb a significant amount of heat from the fuel-cell and, thus, provides more cooling and temperature uniformity than air alone.

In a further embodiment, hot moist air exhaust upon leaving the fuel-cell, is passed through a condenser, which employs ambient air to cool down the fuel-cell exhaust and condenses part of the water vapor to liquid water. The condenser exhaust air optionally also may be passed through a centrifugal separator to extract the remaining liquid water droplets from the water-air mixture, and the extracted water can be collected in an optional tank and then directed back to the water spray nozzles.

The remaining warm air is directly expelled as exhaust, or the remaining air may be pumped to a turbine to drive the motor or pumped to an anode tail oxidizer (ATO) where it is mixed with anode reactant exhaust (hydrogen) to oxidize (combust) the hydrogen and the resulting hot air used to drive the turbine.

In one aspect of the disclosure, there is provided a cooling system for a fuel-cell onboard a vehicle, the cooling system comprising: a cooling circuit defining a coolant passageway, the coolant circuit being configured to circulate cooling air through the coolant passageway and through a portion of the fuel-cell to absorb heat from the fuel-cell; a water sprayer configured to spray water droplets into the cooling air upstream of the fuel-cell; and a condenser downstream of the fuel-cell configured to condense water from the air downstream of the fuel-cell, and to return the condensed water to the water sprayer.

In another aspect, the cooling system further comprises a centrifugal separator downstream of the condenser configured to separate liquid water exiting from the condenser, and to return the separated water to the water sprayer.

In yet another aspect, the vehicle is an aircraft.

The present disclosure provides a method for cooling a fuel-cell onboard a vehicle, said method comprising: providing a coolant passageway comprising a coolant circuit configured to circulate cooling air through the coolant passageway and through a portion of the fuel-cell to absorb heat from the fuel-cell; and spraying water droplets into the cooling air upstream of the fuel-cell.

In one aspect of the method, the air droplets are vaporized from heat of the fuel-cell and including the step of condensing water vapors to liquid water by passing the coolant through a condenser downstream of the fuel-cell.

In another aspect of the method, the condensed water is recycled to the water spray.

In yet another aspect of the method, a centrifugal separator is provided downstream of the condenser configured to separate liquid water exiting from the condenser, separating the water, and returning the separated water to the water spray.

According to one aspect of the present disclosure, there is provided a cooling system for a fuel-cell, the cooling system comprising: a coolant passageway, the coolant system being configured to pass coolant air through the coolant passageway and through a portion of the fuel-cell to absorb heat from the fuel-cell; a water sprayer configured to spray water droplets into the coolant air upstream of the fuel-cell; and an optional water capture system downstream of the fuel-cell configured to capture water from the coolant air and/or the fuel-cell cathode exhaust downstream of the fuel-cell, and to return the captured water to the water sprayer.

Preferably the water capture system comprises a condenser and a water separator downstream of the condenser configured to separate liquid water exiting from the condenser.

Preferably the cooling system further comprises an ATO downstream of the fuel-cell configured to combust unburned hydrogen gas exiting the fuel-cell, and a turbine downstream of the ATO.

Preferably the cooling system further comprises a controller configured to control the fuel-cell and/or to control the amount of water and/or droplet size of water sprayed into the system in response to measured parameters or command inputs.

Preferably water sprayer comprises an aerosol atomizer, and preferably powered by high-pressure air provided by the fuel-cell system's cathode air compressor; a high-pressure liquid nozzle arrangement; or high-pressure liquid streams impinging on a surface or on one another.

Preferably the cooling system further comprises a water tank configured to store water captured from the air coolant air and/or the fuel-cell cathode exhaust downstream of the fuel-cell.

Preferably the cooling system further comprises a mechanism configured to purify the captured water.

Preferably the cooling system further comprises a turbine downstream of the fuel-cell, configured to capture energy from the fuel-cell exhaust gases.

According to another aspect of the present disclosure, the cooling system as described above is installed on a vehicle, preferably an aircraft.

According to yet another aspect of the present disclosure, there is provided a method for cooling a fuel-cell onboard a vehicle, said method comprising: providing a coolant airstream and passing the coolant airstream through a portion of the fuel-cell to absorb heat from the fuel-cell; spraying water droplets into the coolant airstream upstream of the fuel-cell; and optionally capturing water from the coolant airstream and/or the fuel-cell cathode exhaust downstream of the fuel-cell, and recycling the captured water for spraying into the coolant airstream upstream of the fuel-cell.

Preferably the water droplets in the coolant airstream are vaporized from heat of the fuel-cell and including the steps of cooling the coolant airstream downstream of the fuel-cell in a heat exchanger to condense liquid water from the coolant airstream, separating the liquid water from the coolant airstream downstream of the heat exchanger, and optionally recycling the separated water to the water spray.

Preferably the method further comprises providing an ATO downstream of the fuel-cell, combusting hydrogen gas exhausted from the fuel-cell in the ATO and passing the exhaust from the ATO to a turbine.

According to still another aspect of the present disclosure, there is provided a cooling system for a fuel-cell, comprising a fuel-cell having a cathode having an airstream feed and an anode having a hydrogen gas feed; an air compressor for compressing a fuel-cell cathode air feed for the fuel-cell; a water sprayer configured to spray water droplets into the fuel-cell cathode stream feed; and a water capture system downstream of the fuel-cell configured to capture water from cathode exhaust and to return the captured water to the water sprayer.

Preferably the cooling system further comprises an ATO configured to combust hydrogen gas in the anode exhaust.

Preferably the cooling system further comprises a liquid water separator upstream of the ATO.

Preferably the water sprayer comprises an aerosol atomizer, preferably powered by high-pressure air provided by the fuel-cell system's cathode air compressor; a high-pressure liquid nozzle arrangement; or high-pressure liquid streams impinging on a surface or on one another.

Preferably the water capture system comprises a condenser and a water separator downstream of the condenser.

Preferably the cooling system further comprises a controller configured to control operation of the sprayer.

According to another aspect of the present disclosure, the cooling system described above is installed on a vehicle, preferably an aircraft.

In accordance with another embodiment of the present disclosure, we employ a two-phase coolant in a fuel-cell cooling system to exploit the latent heat of vaporization of the coolant whereby to reduce the required coolant flow rates, thus reducing the pump size, heat exchanger and other cooling system components thereby reducing the mass and parasitic power requirements of the cooling system. Additional benefits are a reduction in weight and size, and more packaging flexibility. The two-phase coolant comprises a dielectric material which permits the coolant to be circulated directly through the fuel-cell bipolar plate cooling channels.

In one aspect, one or more parts of the cooling system is sized below that required for peak power operation of the vehicle, and the coolant and cooling system is selected to match the thermophysical properties to the fuel-cells operating temperature for and employ heat of evaporation of the coolant during peak vehicle operation, i.e., during takeoff and climb in the case of a fuel-cell powered aircraft.

In another aspect, one or more parts of the cooling system is sized below that require for peak power operation of the vehicle, and coolant pressure is increased to increase boiling point of the two-phase coolant system.

In yet another aspect, the cooling system includes a controller programmed to control operation of valves and pumps of the cooling system and flow of the coolant depending on cooling demands whereby to maintain coolant pressure in a desired range for evaporation/condensation to occur at a desired temperature, i.e., the design operating temperature of the fuel-cell or fuel-cell stack.

In yet another aspect, the coolant system includes a throttling valve and a controller configured to control operation of the throttling valve to match saturation temperature to target fuel-cell set point or fuel-cell operating temperature whereby to assure equal cooling across the evaporator and across the fuel-cell stack.

In a particularly preferred aspect, the vehicle comprises a fuel-cell powered aircraft.

According to yet another aspect of the present invention, there is provided a cooling system for a fuel-cell aboard a vehicle, wherein the cooling system comprises a fluid circuit configured to circulate a coolant comprising a phase-change material (PCM) through a coolant channel in contact with the fuel-cell to absorb heat from the fuel-cell; a heat exchanger comprising an extension of the coolant channel and an airflow channel connecting an air inlet and an air outlet, wherein the extension of the coolant channel is separated from the air flow channel; a pump configured for pressurizing and circulating the coolant through the system; a throttling valve for controlling pressure on the coolant as the coolant is circulated through the system, wherein the coolant has a boiling point at pressure that is below the fuel-cell operating temperature, and a controller configured to control operation of the pump and the throttling valve to partially or completely evaporate the coolant so that the coolant exits contact with the fuel-cell as a two-phase mixture or as a super-heated vapor.

Preferably the cooling system further includes one or more sensors upstream of the heat exchanger for detecting temperature and/or pressure of the coolant entering the heat exchanger.

Preferably the cooling system further includes a coolant buffer tank configured to hold liquid coolant between the outlet of the heat exchanger and the pump.

Preferably the air inlet to the heat exchanger is closable at least in part.

Preferably the air inlet to the heat exchanger is configured to close at least in part when the temperature of the coolant exiting the heat exchanger approaches ambient temperature.

Preferably the coolant has a boiling point at 2 to 3 bar pressure that is 2 to 10° C. below the fuel-cell operating temperature.

Preferably the controller is configured to control operation of the throttling valve and pump to maintain the coolant in a desired range for evaporation/condensation to occur at design operating temperatures of the fuel-cell.

Preferably the coolant is circulated through cooling channels in the fuel-cell.

Preferably the vehicle comprises a fuel-cell powered aircraft.

According to one aspect of the present invention, there is provided a method of cooling a fuel-cell aboard a vehicle, comprising the steps of providing a cooling system of the present invention as set out above.

According to another aspect of the present invention, there is provided a method of cooling a fuel-cell aboard a vehicle, comprising the steps of: providing a cooling system comprising fluid circuit configured to circulate through a coolant channel, a coolant comprising a PCM in contact with the fuel-cell to absorb heat from the fuel-cell; a heat exchanger comprising an extension of the coolant channel and an airflow channel connecting an air inlet and an air outlet, wherein the coolant channel is separated from the air flow channel; a pump configured for pressurizing and circulating the coolant through the system; a throttling valve for controlling pressure on the coolant as the coolant is circulated through the system, wherein the coolant has a boiling point at pressure that is below the fuel-cell operating temperature, and a controller configured to control operation of the pump and the throttling valve to partially or completely evaporate the coolant so that the coolant exits contact with the fuel-cell as a two-phase mixture or as a super-heated vapor.

Preferably the method further includes sensing the temperature of the coolant exiting the heat exchanger and adjusting airflow through the heat exchanger based on the temperature of the coolant.

Preferably the coolant has a boiling point at 2 to 3 bar pressure that is 2 to 10° C. below the fuel-cell operating temperature.

Preferably the controller controls operation of the throttling valve and pump to maintain the coolant in a desired range for evaporation/condensation to occur at design operating temperatures of the fuel-cell.

Preferably the coolant is circulated through cooling channels in the fuel-cell.

In accordance with yet another embodiment of the present disclosure, there is provided a cooling system for a fuel-cell system onboard a vehicle comprising a primary ambient air heat exchanger coolant loop for cooling the fuel-cell system, and a secondary heat exchanger coolant loop comprising a fluid circuit configured to circulate a coolant in thermal contact with a PCM and in thermal contact with the fuel-cell to absorb heat from the fuel-cell.

In one embodiment, the cooling system for a fuel-cell system is onboard a vehicle.

In another embodiment, the secondary coolant loop includes a heat pump.

In one embodiment, the secondary heat exchanger coolant loop includes an electrically driven heat pump.

In yet another embodiment, the secondary heat exchanger coolant loop comprises an extension of the primary ambient air heat exchanger coolant loop. In such embodiment, the secondary coolant loop may selectively be isolated from the primary ambient air coolant loop, and, the electrically powered heat pump is configured to cool the PCM to remove excess heat from the PCM when excess heat produced by the fuel-cell is not completely dissipated by the primary ambient air heat exchanger coolant loop, and/or to add heat to the PCM to heat the fuel-cell system during warmup.

In one aspect, the heat pump is an electrically driven heat pump, and electricity for powering the heat pump is provided at least in part by the fuel-cell onboard the vehicle.

In another aspect, the heat pump is an electrically driven heat pump, and electricity for powering the heat pump is provided at least in part from an onboard battery, a ground based electrical energy cart, a ground based electrical energy grid or regenerative power produced, for example, by vehicle braking or in the case of a fuel-cell powered aircraft propeller/motor braking during descent.

In yet another aspect, the heat pump is a mechanically driven heat pump, which is mechanically driven at least in part by an onboard mechanical power service.

In still yet another aspect, the heat pump is a thermally driven heat pump, which is thermally driven at least in part by an absorption refrigeration cycle, such as from hot exhaust from an onboard fuel-cell or an onboard compressor outlet.

In another aspect, the secondary heat exchanger coolant loop is independently connected to the fuel-cell, separate from the primary ambient air heat exchanger coolant loop.

In still another aspect, the secondary coolant loop is selectively connected to the same coolant loop used by the fuel-cell primary ambient air heat exchanger, via valves.

In another aspect, the heat pump is connected in series with the fuel-cell and the primary ambient air heat exchanger coolant loop, wherein the primary ambient air heat exchanger coolant loop preferably is located immediately downstream of the fuel-cell between the fuel-cell and the heat pump.

In yet another aspect, the heat pump is located between the fuel-cell primary ambient air coolant loop and the secondary coolant loop.

In still yet another aspect, a bypass valve is provided to allow heat from the fuel-cell to be delivered to the heat pump without passing through the primary ambient air heat exchanger coolant loop.

In one aspect, the primary ambient air coolant loop is sized below that required for maximum continuous power operation of the vehicle, and the secondary coolant loop is sized to supplement the primary ambient air coolant loop to match the maximum continuous power operation during peak vehicle operation, e.g., during takeoff and climb in the case of a fuel-cell powered aircraft.

In yet another aspect, the cooling system includes a controller to control operation of the heat pump and valves and pumps to control flow of coolant through the fuel-cell and the primary ambient air coolant loop and the secondary PCM coolant loop depending on cooling demands.

In various embodiments, the thermal connector to the PCM may be through independent heat exchangers, or through the fuel-cell ambient air coolant heat exchanger(s).

In a particularly preferred aspect, the vehicle comprises a fuel-cell powered aircraft.

The present disclosure also provides a method for cooling a fuel-cell aboard a vehicle comprising providing a primary ambient air heat exchanger coolant loop and a secondary heat exchanger coolant loop comprising a fluid circuit configured to circulate a coolant in thermal contact with a PCM and also in thermal contact with the fuel-cell, and selectively circulating the coolant through the fluid circuit.

In one embodiment, the secondary heat exchanger coolant loop includes a heat pump for cooling the PCM.

In another aspect of the process, the heat pump is an electrically driven heat pump.

In a further aspect of the process, the electrically driven heat pump is electrically driven, at least in part, by electrical energy from the fuel-cell.

In accordance with still yet another aspect of the present disclosure, we provide an auxiliary cooling system for a fuel-cell onboard a vehicle that employs the heat of gasification of the liquid hydrogen fuel to facilitate cooling of the fuel-cell. In one aspect, the liquid hydrogen fuel is passed to the gasifier where the liquid hydrogen fuel is expanded to gaseous hydrogen, and the heat of gasification employed to cool the fuel-cell. The gaseous hydrogen is then fed directly to the hydrogen fuel-cell or stored in an accumulator tank for future delivery to the hydrogen fuel-cell. Alternatively, a portion of the liquid hydrogen is evaporated, the heat of gasification used to cool the fuel-cell, and the gaseous hydrogen is released or purged safely behind the vehicle.

In a further aspect of the disclosure, there is provided a cooling system for a fuel-cell onboard a vehicle, wherein the fuel-cell includes a gasifier configured to expand liquid hydrogen to gaseous hydrogen for feed to the fuel-cell, the cooling system comprising: a coolant system sized below that required for peak power operation of the vehicle; and an auxiliary coolant system configured to provide supplemental cooling to the fuel-cell, wherein the supplemental coolant system is configured to by-pass coolant to the gasifier and employ heat of gasification of the liquid hydrogen to provide supplemental cooling for the fuel-cell during peak vehicle operation.

In one aspect, the auxiliary coolant system includes an accumulator tank for accumulating excess gaseous hydrogen created by the auxiliary cooling system, preferably a variable volume tank, more preferably a balloon or bellows tank.

In another aspect, the auxiliary coolant system is configured to vent at least a portion of the hydrogen after gasification.

In another aspect, the cooling system sized below that required for peak power operation of the vehicle comprises a phase-change coolant system.

In yet another aspect, the cooling system includes a controller configured to control operation of the coolant system sized below that required for peak power operation of the vehicle and the auxiliary coolant system. In such aspect, the controller preferably is programmed to control operation of valves and pumps of the cooling system and flow of coolant and hydrogen depending on cooling demands, and to control liquid hydrogen level, temperature and pressure of the liquid hydrogen passed to the gasifier, depending on one or more of fuel-cell power requirements, fuel-cell temperature, fuel-cell maximum design operating temperature and Outside Air Temperature (OAT).

In a particularly preferred aspect, the vehicle comprises a fuel-cell powered aircraft.

The present disclosure also provides a method for cooling a fuel-cell aboard a vehicle, wherein the fuel-cell includes a cooling system and a gasifier configured to expand liquid hydrogen to gaseous hydrogen for feed to the fuel-cell, providing a coolant system sized below that required for peak power operation of the vehicle and an auxiliary coolant system configured to provide supplemental cooling to the fuel-cell, wherein the auxiliary coolant system is configured to by-pass coolant to the gasifier, and activating the auxiliary coolant system during peak vehicle operation, employing heat of gasification of the liquid hydrogen.

In one aspect, the auxiliary coolant system includes an accumulator tank for accumulating excess gaseous hydrogen created by the auxiliary coolant system. In such aspect, the accumulator tank preferably comprises a variable volume tank, more preferably a balloon or bellows tank.

In another aspect, the auxiliary coolant system is configured to vent at least a portion of the by-passed hydrogen after gasification and includes the step of venting a portion of the by-passed hydrogen.

In another aspect, the coolant system sized below that required for peak power operation of the vehicle comprises a phase-change coolant system.

In yet another aspect, the cooling system further includes a controller for a hydrogen fuel-cell powered vehicle including a gasifier and a coolant system, wherein the coolant system includes a coolant system sized below that required for peak power operation of the vehicle, and an auxiliary coolant system which auxiliary coolant system is configured to by-pass coolant to the gasifier, and including the step of controlling operation of the cooling system based on vehicle operating conditions and environmental conditions. In such aspect, the controller preferably is programmed to control operation of valves and pumps of the cooling system and flow of coolant depending on cooling demands, and to control liquid hydrogen level, temperature and pressure of the liquid hydrogen passed to the gasifier, depending on one or more of fuel-cell power requirements, fuel-cell temperature, fuel-cell maximum design operating temperature and OAT.

In accordance with yet another the present disclosure, fuel-cell cooling is controlled to remove excess waste heat generated by the fuel-cell(s) or fuel-cell stack across a full range of operating conditions including cruise, takeoff, and climb. To accomplish this, a multi-mode cooling system is provided employing a two-phase coolant configured to operate below coolant boiling point during cruise, and configured to allow coolant temperature to rise so that two-phase cooling occurs thereby minimizing the need to increase pumping requirements at peak load. More particularly, the thermophysical properties are matching the coolant under operating conditions to the fuel-cell cooling requirements at operating conditions by selection of an appropriate coolant and controlling the cooling system to increase the boiling point of the coolant in a desired range for evaporation/condensation by altering pressure on the coolant. In this regard, a coolant is selected that has a boiling point at 2 to 3 bar that is 2 to 10° C. below the fuel-cell operating temperature, and the pressure is controlled on the coolant to increase the pressure to raise the coolant boiling point and correspondingly the enthalpy of the system during peak cooling demand conditions, i.e., during takeoff and climb. The coolant should be a dielectric so that the coolant may be circulated directly through the fuel-cell cooling channels. Various low boiling point dielectric fluids are available commercially for use as coolants in accordance with the present disclosure, including but not limited to NOVEC™ and FLUORINERT™, which are both available from 3M Company. Other working fluids may include high temperature refrigerants such as R1233ZD, R1243ZF, R1234ZE (E) and R1234ZE (z).

More particularly, in accordance with the present disclosure we provide a cooling system for a fuel-cell aboard a vehicle, wherein the cooling system comprises a fluid circuit configured to circulate a coolant comprising a PCM through a coolant channel in contact with the fuel-cell to absorb heat from the fuel-cell; a heat exchanger comprising an extension of the coolant channel and an airflow channel connecting an air inlet and an air outlet, wherein the extension of the coolant channel is separated from the air flow channel; a pump configured for pressurizing and circulating the coolant through the system; a throttling valve for controlling pressure on the coolant as the coolant is circulated through the system, wherein the coolant has a boiling point at pressure that is below the fuel-cell operating temperature, and a controller configured to control operation of the pump and the throttling valve to partially or completely evaporate the coolant so that the coolant exits contact with the fuel-cell as a two-phase mixture or as a super-heated vapor.

In one aspect, the system includes one or more sensors upstream of the heat exchanger for detecting temperature and/or pressure of the coolant entering the heat exchanger.

In another aspect, the system includes a coolant buffer tank configured to hold liquid coolant between the outlet of the heat exchanger and the pump.

In another aspect, the air inlet to the heat exchanger is closable at least in part.

In yet another aspect, the air inlet to the heat exchanger is configured to close at least in part when the temperature of the coolant exiting the heat exchanger approaches ambient temperature.

In another aspect, the coolant has a boiling point at 2 to 3 bar pressure that is 2 to 10° C. below the fuel-cell operating temperature.

In a further aspect, the controller is configured to control operation of the throttling valve and pump to maintain the coolant in a desired range for evaporation and condensation to occur at design operating temperatures of the fuel-cell and heat exchanger, respectively.

In yet a further aspect, the coolant is circulated through the cooling channel in the fuel-cell.

In a further aspect, the vehicle comprises a fuel-cell powered aircraft.

The present disclosure also provides a method of cooling a fuel-cell aboard a vehicle, comprising the steps of: providing a cooling system comprising fluid circuit configured to circulate through a coolant channel a coolant comprising a PCM in contact with the fuel-cell to absorb heat from the fuel-cell; a heat exchanger comprising an extension of the coolant channel and an airflow channel connecting an air inlet and an air outlet, wherein the coolant channel is separated from the air flow channel; a pump configured for pressurizing and circulating the coolant through the system; a throttling valve for controlling pressure on the coolant as the coolant is circulated through the system, wherein the coolant has a boiling point at pressure that is below the fuel-cell operating temperature, and a controller configured to control operation of the pump and the throttling valve, and controlling operation of the pump and throttling valve to partially or completely evaporate the coolant so that the coolant exits contact with the fuel-cell as a two-phase mixture or as a super-heated vapor.

In one aspect, the method further includes sensing the temperature of the coolant exiting the heat exchanger and adjusting airflow through the heat exchanger based on the temperature of the coolant.

In another aspect of the method, the coolant has a boiling point at 2 to 3 bar pressure that is 2 to 10° C. below the fuel-cell operating temperature.

In a further aspect of the method, the controller controls operation of the throttling valve and pump to maintain the coolant in a desired range for evaporation/condensation to occur at design operating temperatures of the fuel-cell.

In yet another aspect of the method, the coolant is circulated through cooling channels in the fuel-cell.

Further areas of applicability will become apparent from the description provided herein. The description and specific examples in this summary are intended for purposes of illustration only and are not intended to limit the scope of the present disclosure.

Further features and advantages of the disclosure will be seen in the following detailed description, taken in conjunction with the accompanying drawings. The drawings described herein are for illustrative purposes only of selected embodiments and not all possible implementations and are not intended to limit the scope of the present disclosure.

IN THE DRAWINGS

Figure 13:
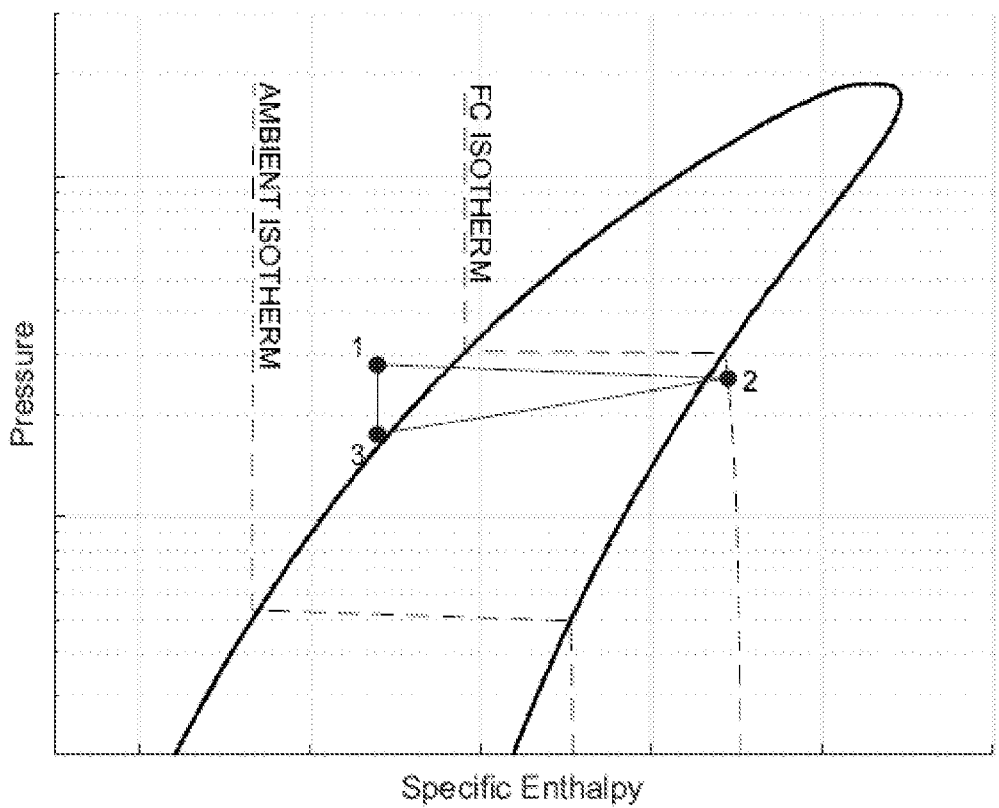
Figure 14:
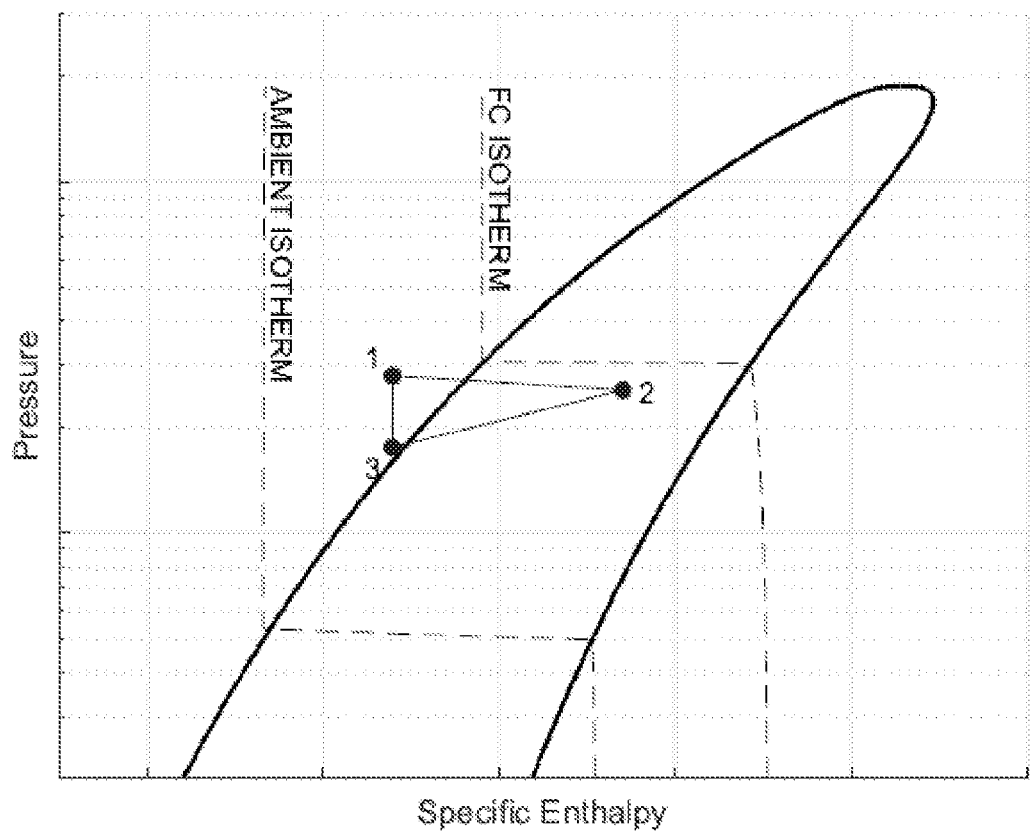
Figure 15:
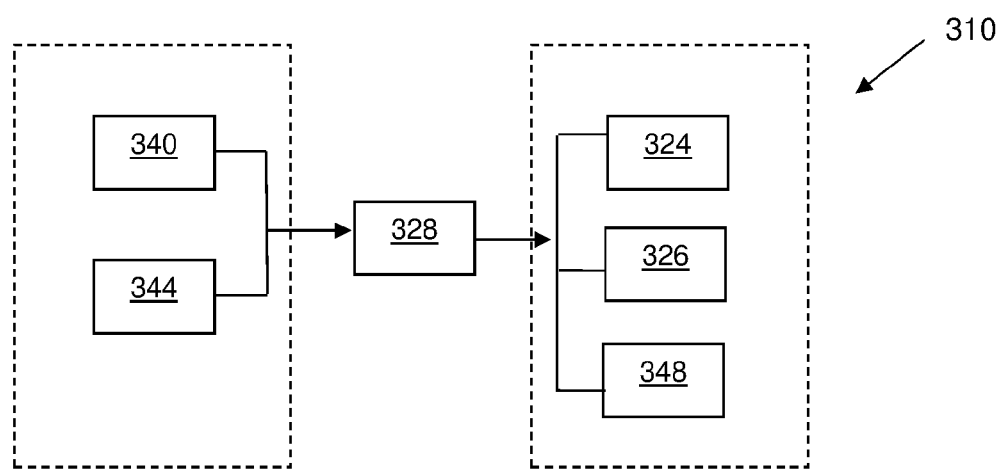
Figure 16:
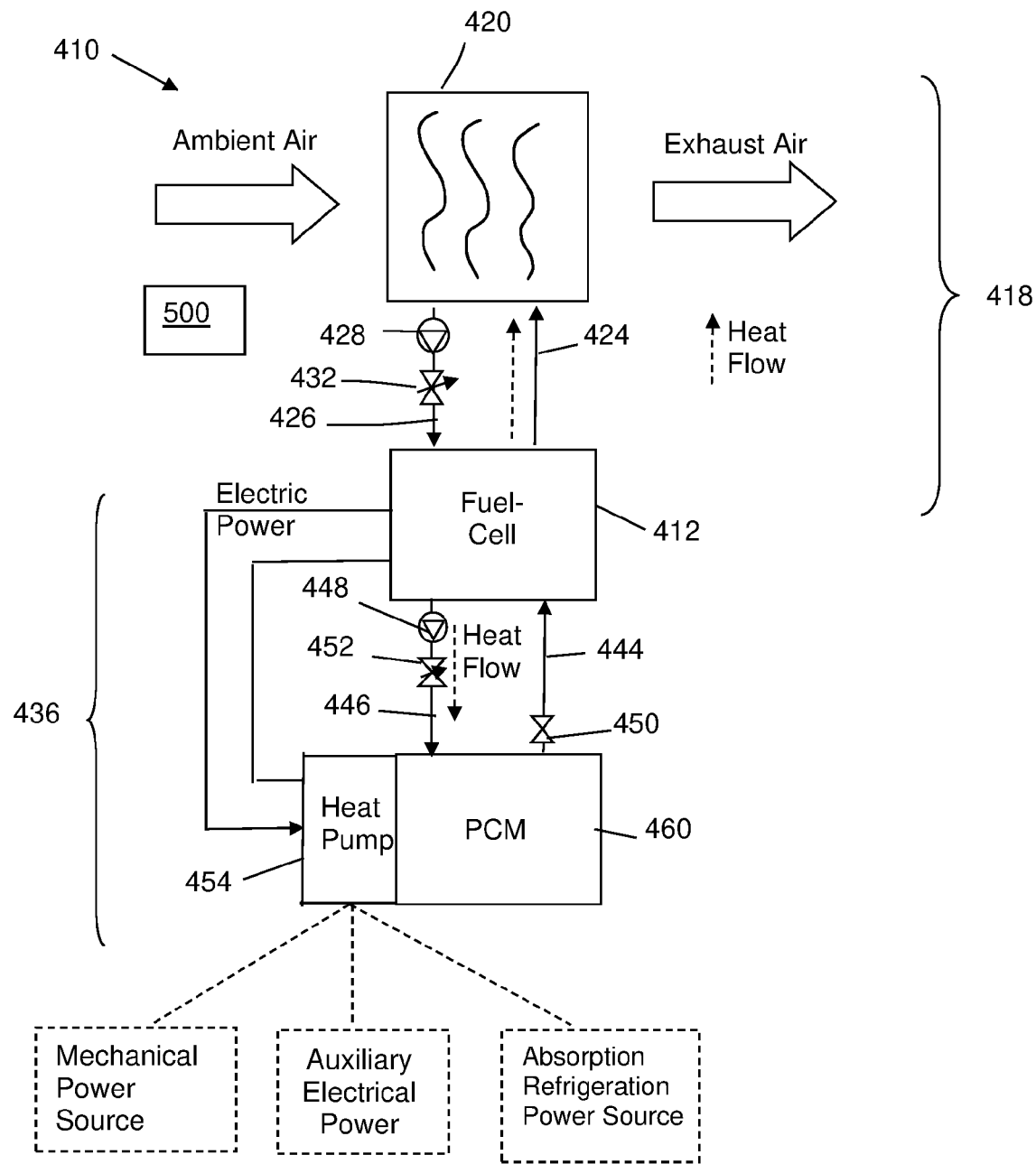
Figure 17:
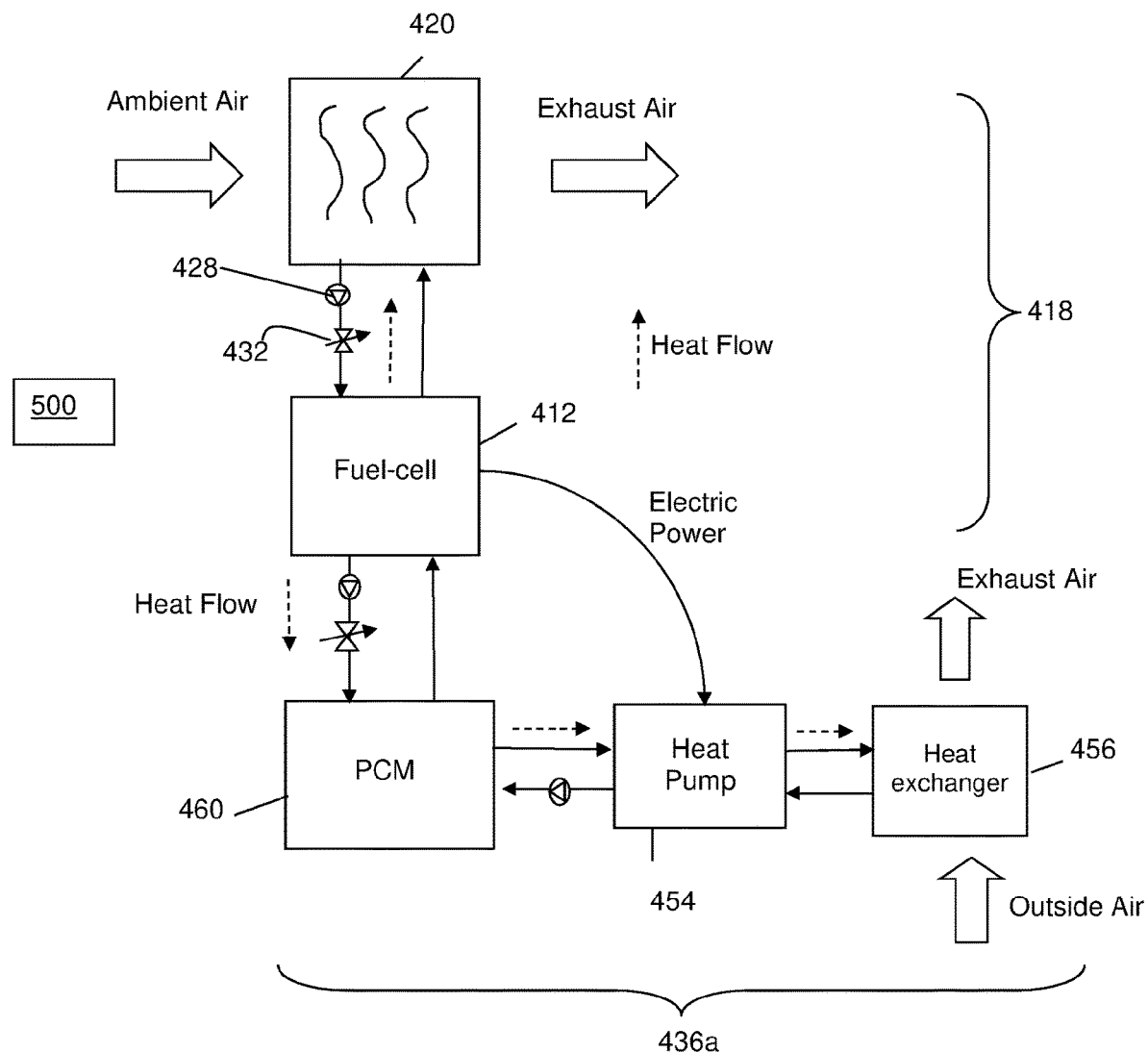
Figure 18A:
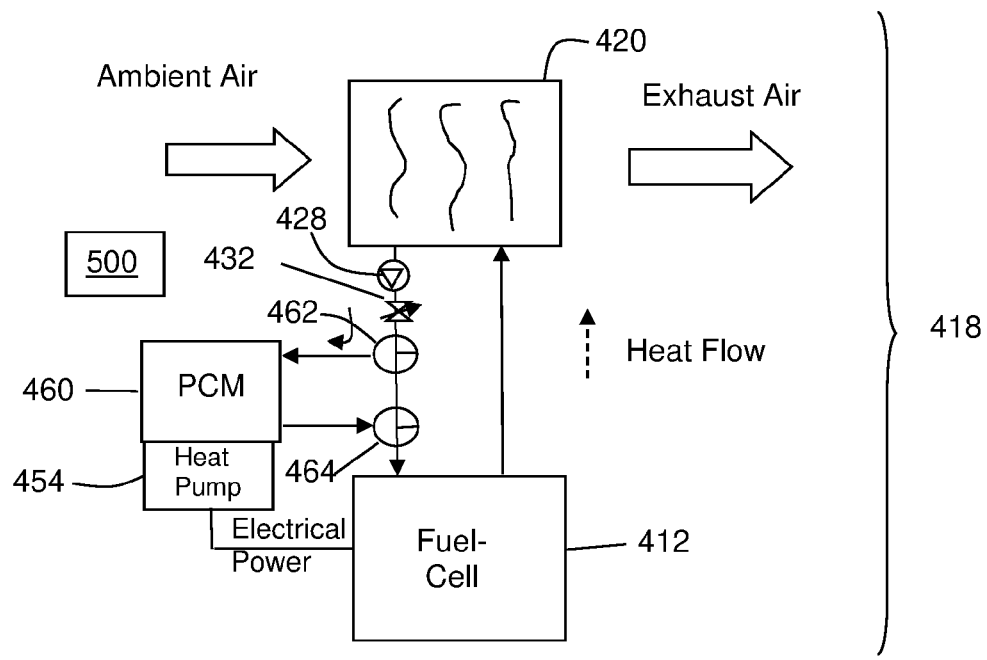
Figure 18B:
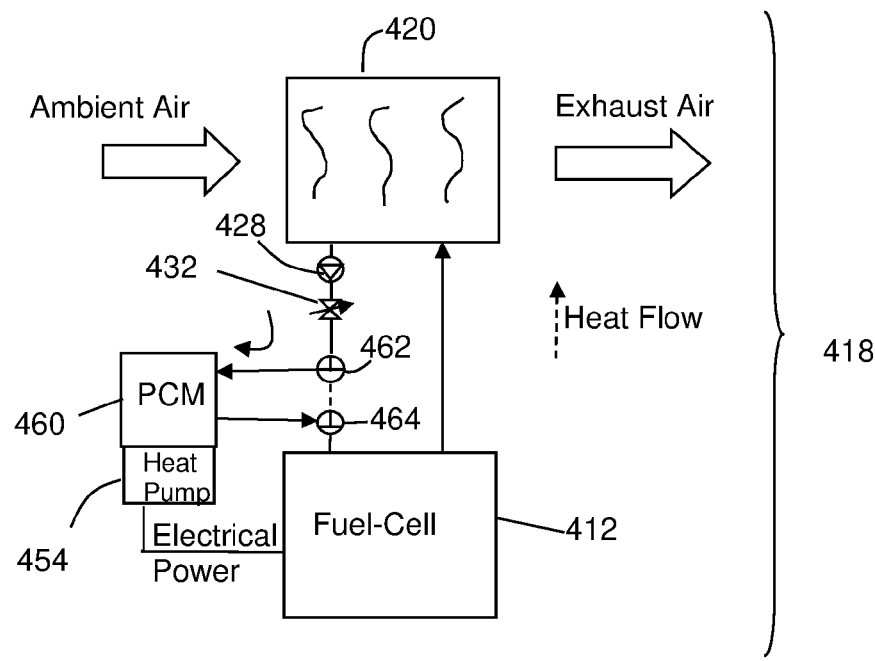
Figure 18C:
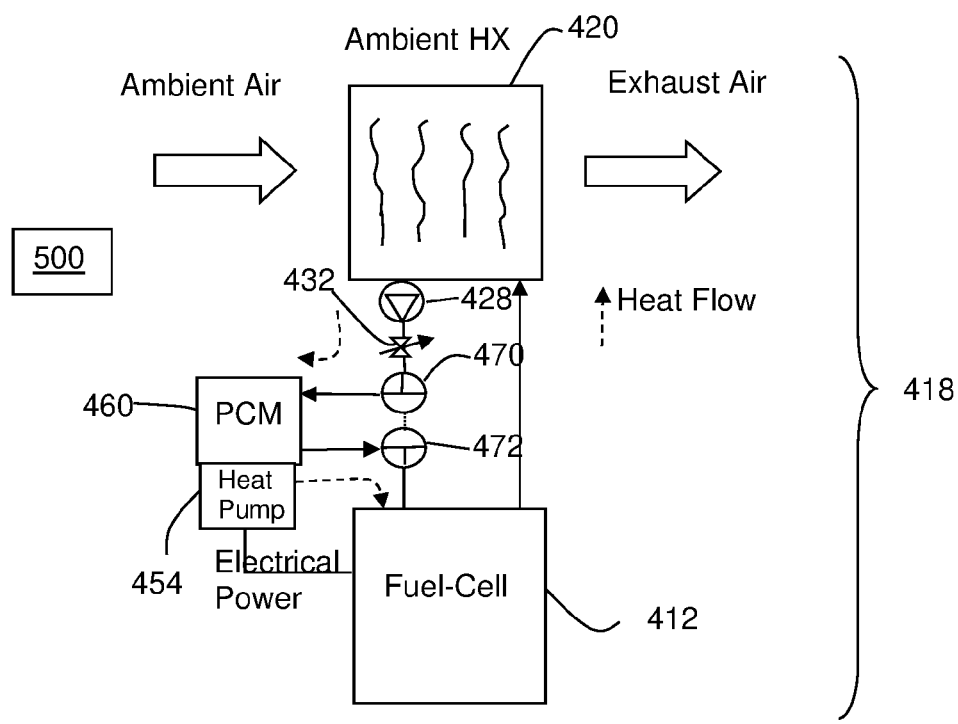
Figure 19:
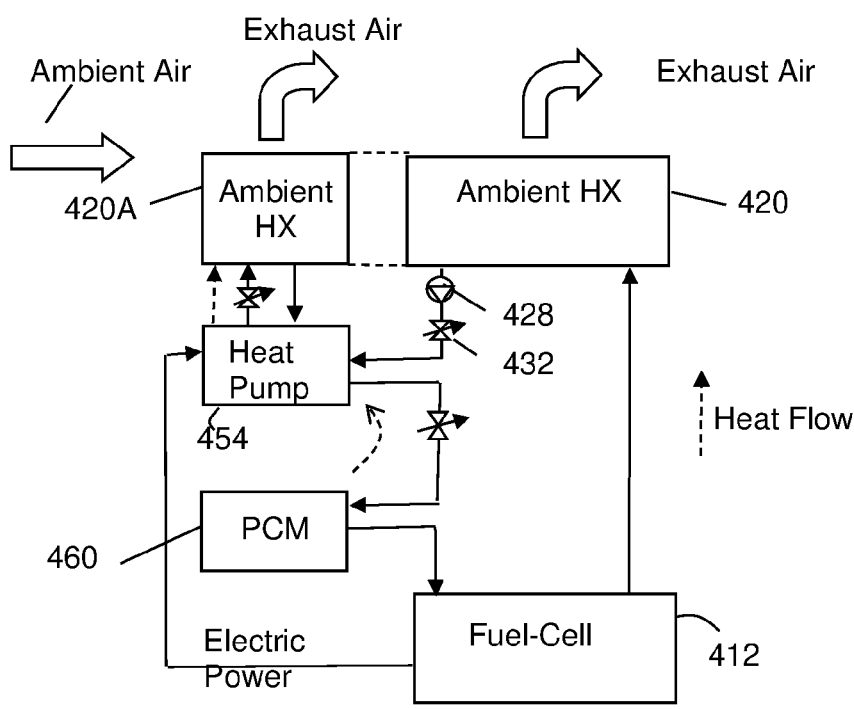
Figure 20A:
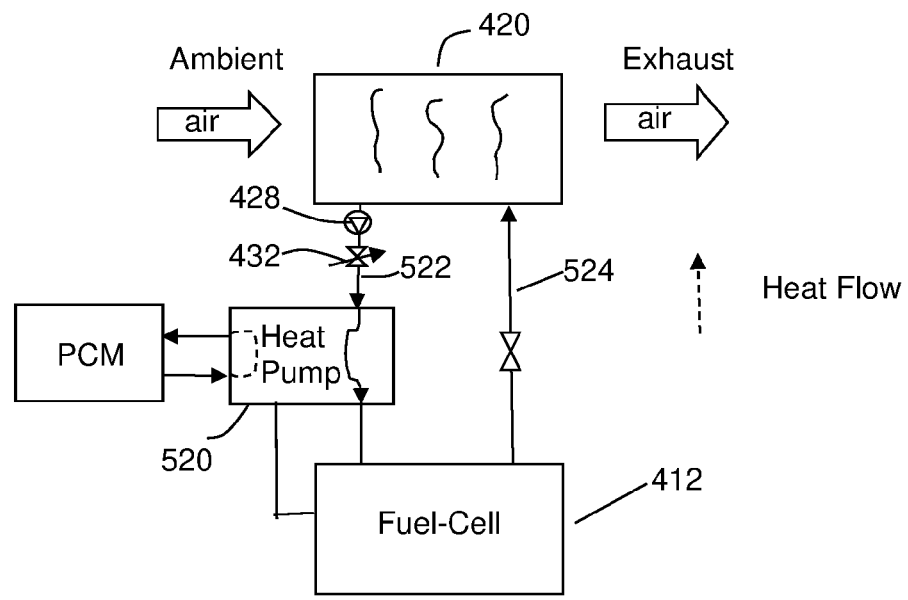
Figure 20B:
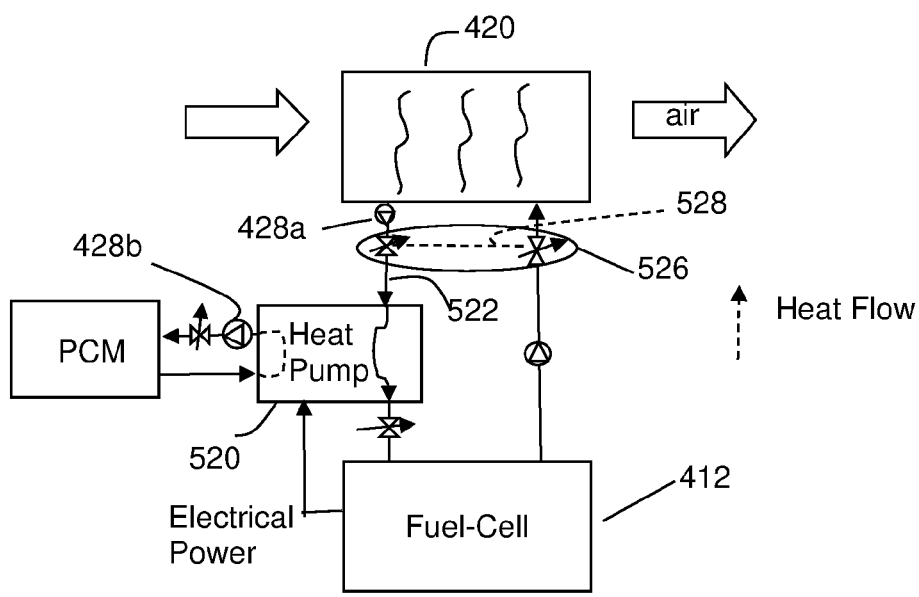
Figure 21:
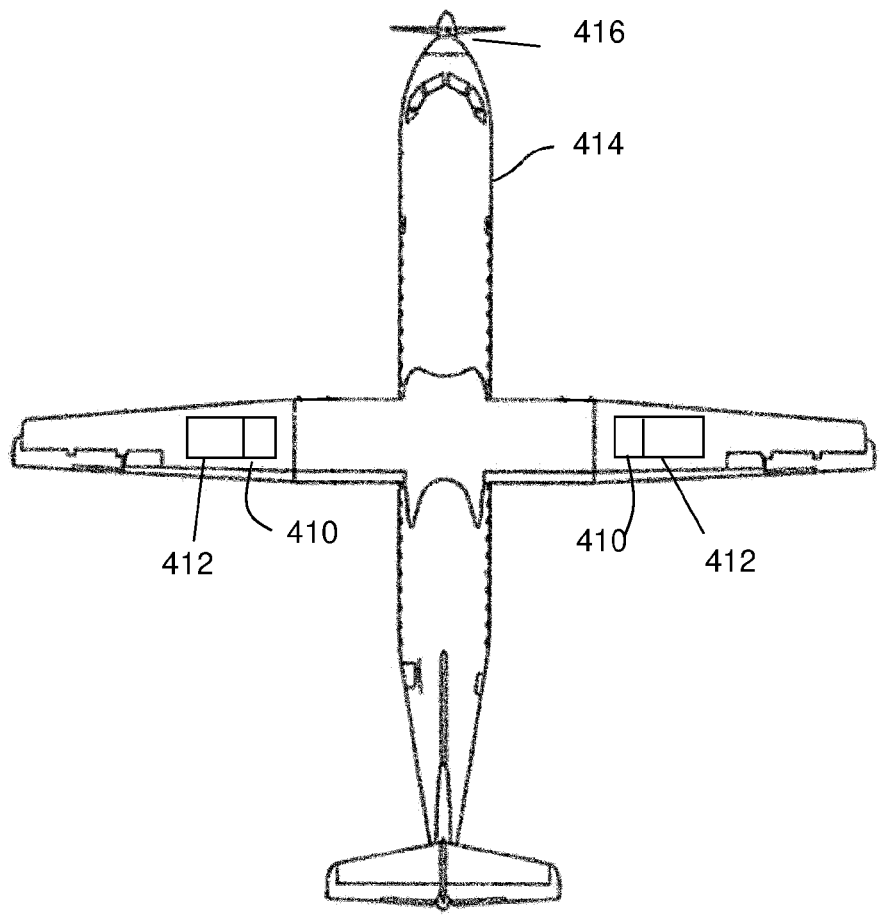
Figure 22:
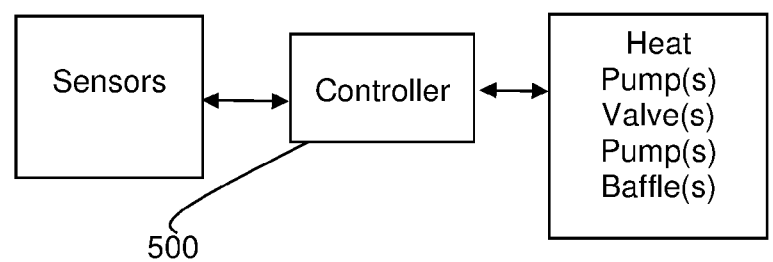
Figure 23:
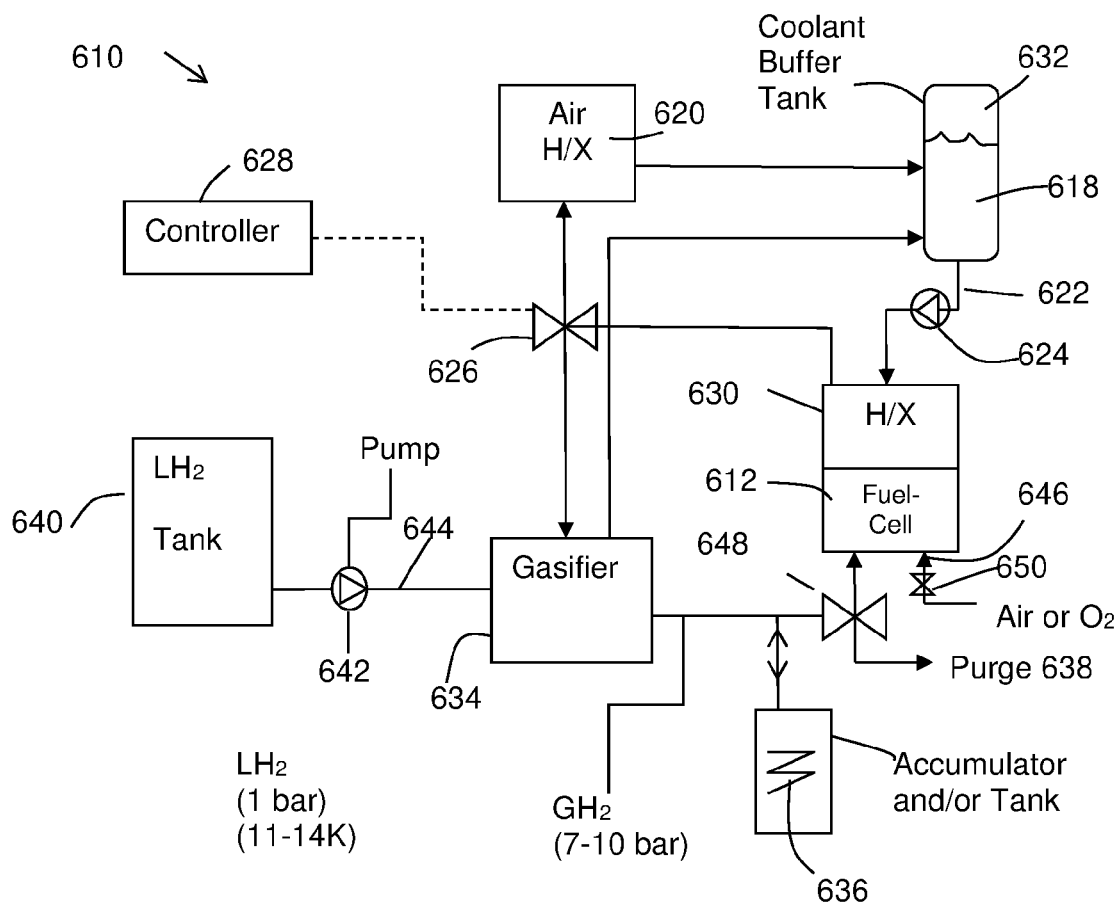
Figure 25:
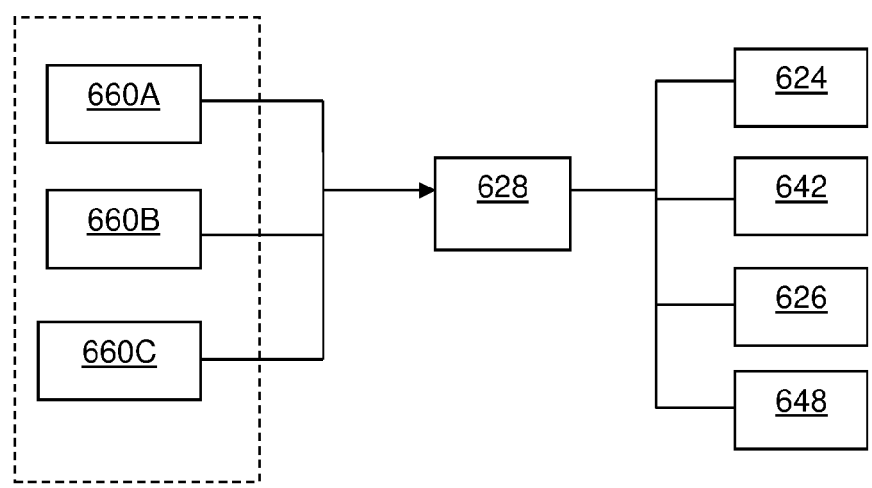
Figure 24:
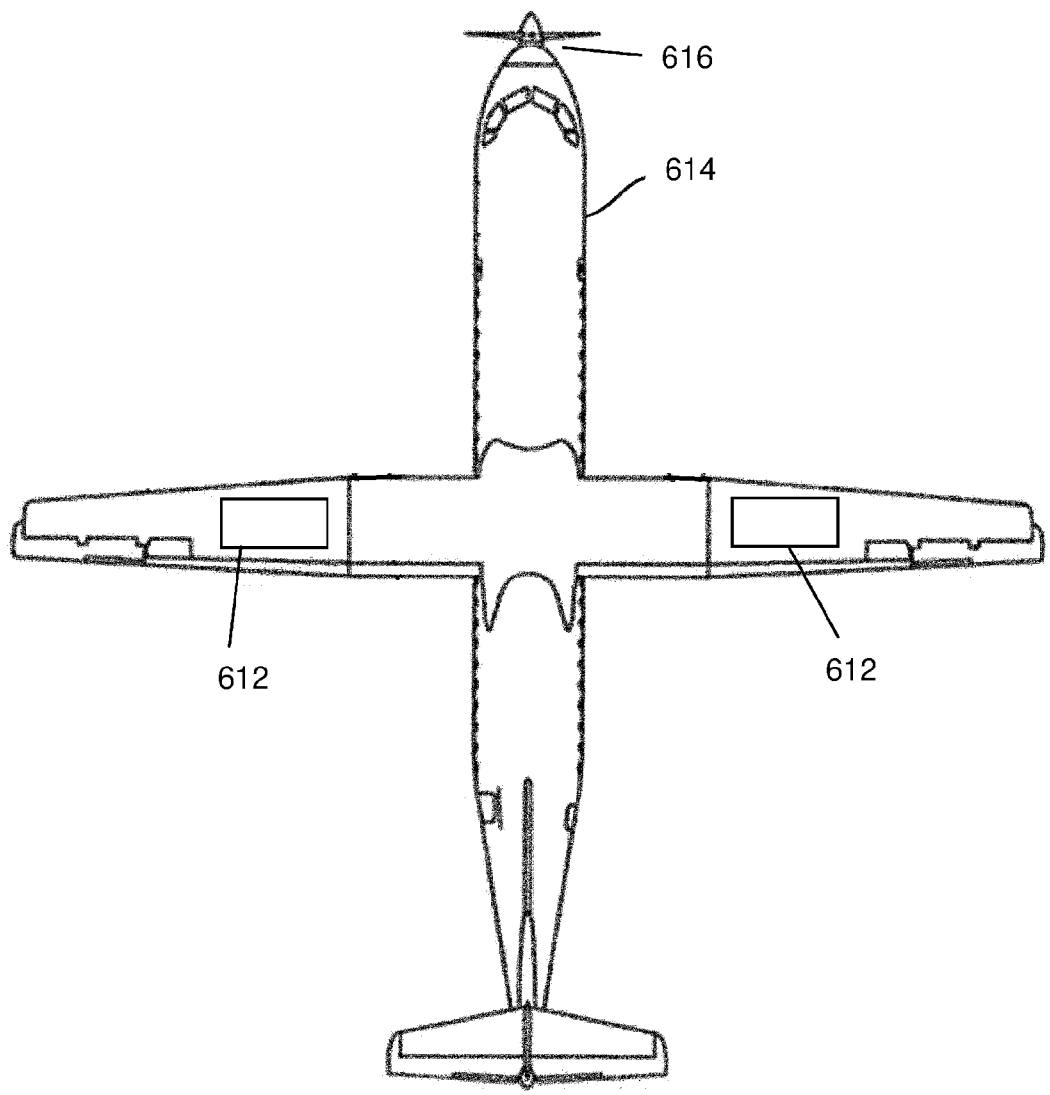

FIGS. 13 and 14 graphically illustrate pressure verses specific enthalpy of a two-phase coolant controlled in accordance with another aspect of the present disclosure;

FIG. 15 is a block diagram showing operation and control of the cooling system in accordance with the present disclosure;

FIG. 16 is a flow diagram of a cooling system for a fuel-cell in accordance with a still further aspect of the present disclosure;

FIG. 17 is a flow diagram of a cooling system for a fuel-cell in accordance with a second embodiment of the present disclosure;

FIGS. 18a-18c are flow diagrams of a cooling system for a fuel-cell in accordance with yet another embodiment of the present disclosure;

FIG. 19 is a flow diagram of a cooling system for a fuel-cell in accordance with yet other embodiments of the present disclosure;

FIGS. 20a and 20b are flow diagrams of a cooling system for a fuel-cell in accordance with still yet another embodiment of the present disclosure;

FIG. 21 is a schematic depiction of an aircraft including a fuel-cell and fuel-cell cooling system onboard the aircraft in accordance with the present disclosure;

FIG. 22 is a block diagram showing operation and control of the cooling system in accordance with the present disclosure;

FIG. 23 is a process flow diagram of a cooling system for a fuel-cell aboard a vehicle in accordance with the present disclosure;

FIG. 24 is a schematic depiction of an aircraft including a fuel-cell and fuel-cell cooling system onboard the aircraft in accordance with the present disclosure; and FIG. 25 is a block diagram illustrating operation of a fuel-cell cooling system in accordance with the present disclosure.

Example embodiments will now be described more fully with reference to the accompanying drawings. Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "fuel-cell" is intended to include an electrochemical cell that converts the chemical energy of a fuel (typically hydrogen) and an oxidizing agent (typically oxygen) into electricity through a pair of redox reactions. There are many types of fuel-cells, but they all include an anode, a cathode, and an electrolyte that allows ions, usually positively charged hydrogen ions or protons, to move between two sides of the fuel-cell. At the anode, a catalyst causes the fuel to undergo oxidized reactions that generate ions, typically positively charged hydrogen ions, and electrons. The ions move from the anode to the cathode through the electrolyte. At the same time, electrons flow from the anode to the cathode through an external circuit, producing direct current electricity. At the cathode, another catalyst causes ions, electrons, and oxygen to react, forming water in the case of a hydrogen fuel-cell, and possibly other products. Fuel-cells are classified by the type of electrolyte they use and by the difference in startup electrolyte they use.

As used herein the term "heat pump" any one or more mechanical or thermoelectric devices that create a heat flux including, for example, mechanical devices that produce a heat flux through a vapor compression cycle, a vapor absorption cycle, a gas cycle, and a Carnot cycle as well as thermoelectric devices that create a transfer of heat through the Peltier Effect.

The present disclosure has particular applicability to proton-exchange membrane hydrogen fuel-cells, or so-called hydrogen fuel-cells, for powering vehicles such as aircraft, although the disclosure is not limited to hydrogen fuel-cells for powering aircraft. The disclosure advantageously may be used in connection with other types of fuel-cells including, but not limited to methanol and ethanol fuel-cells, for both stationary and vehicular installations.

Also as used herein the term "fuel-cell" is used to describe a single fuel-cell as well as a fuel-cell stack comprising a plurality of fuel-cells connected in in series by stacking one on top of another.

Figure 1:
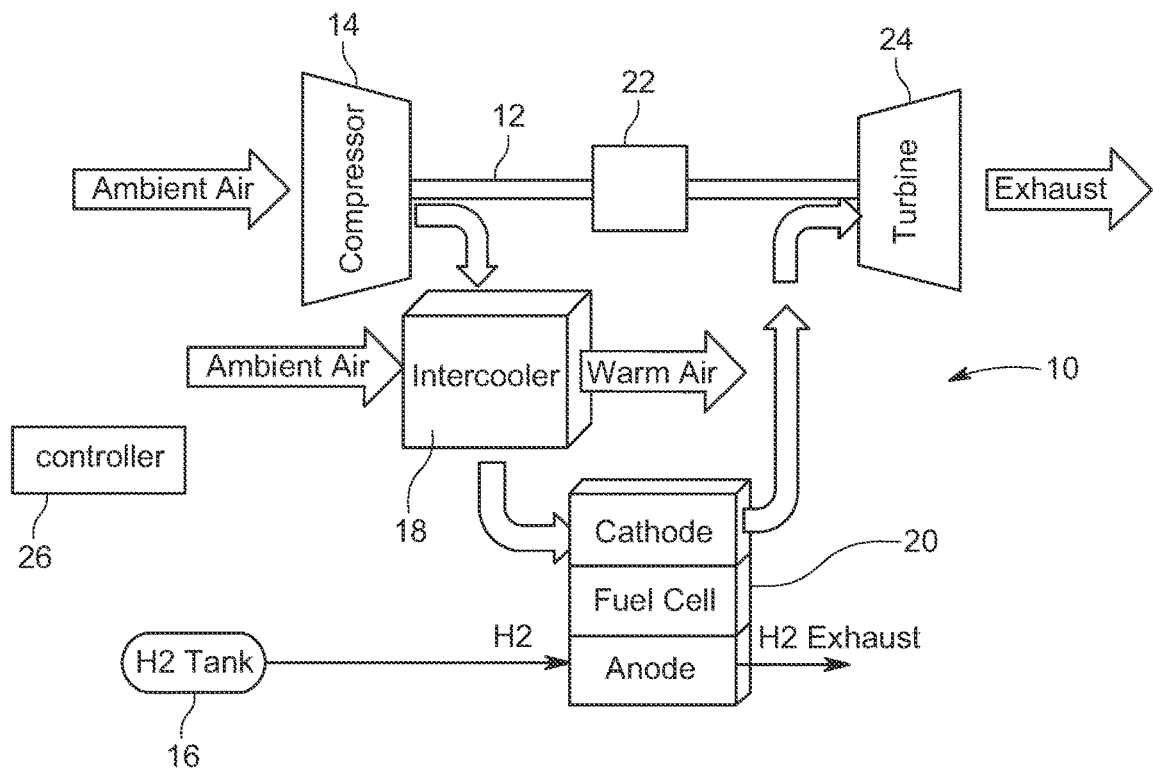
FIG. 1 is a schematic cross-sectional view of an integrated hydrogen-electric engine system in accordance with the prior art.
Figure 1A:
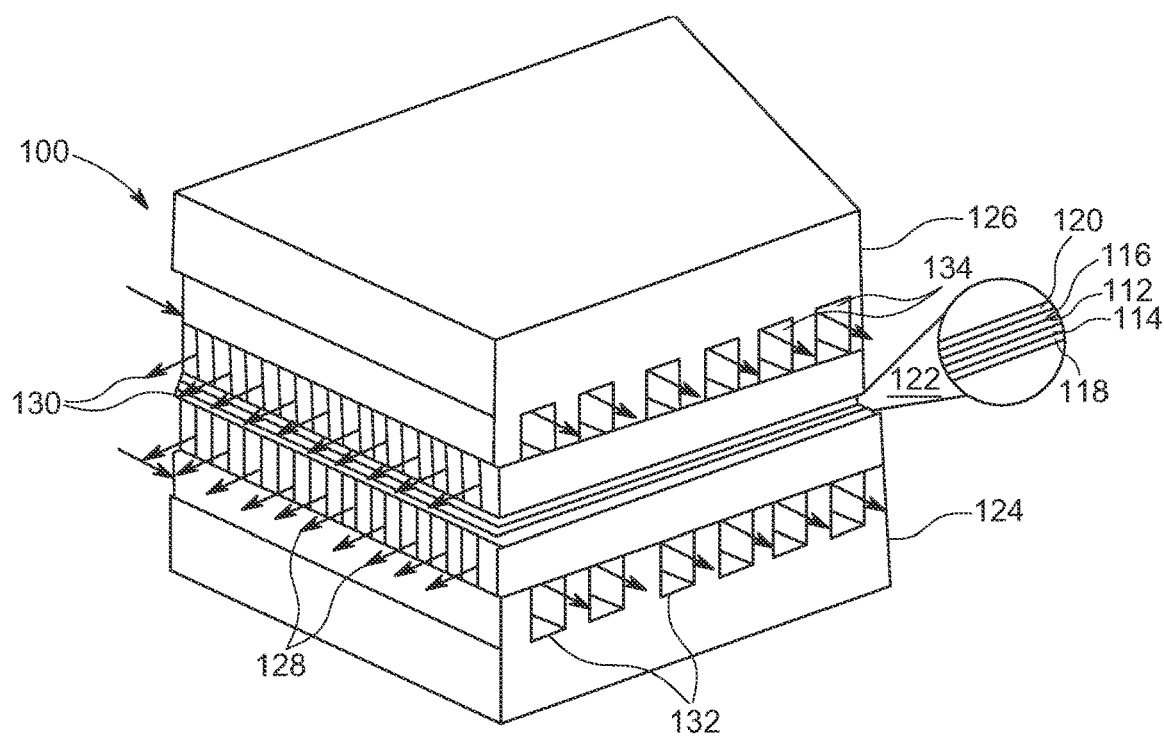
FIG. 1a is a perspective view of a fuel-cell in accordance with the prior art.
Figure 2:
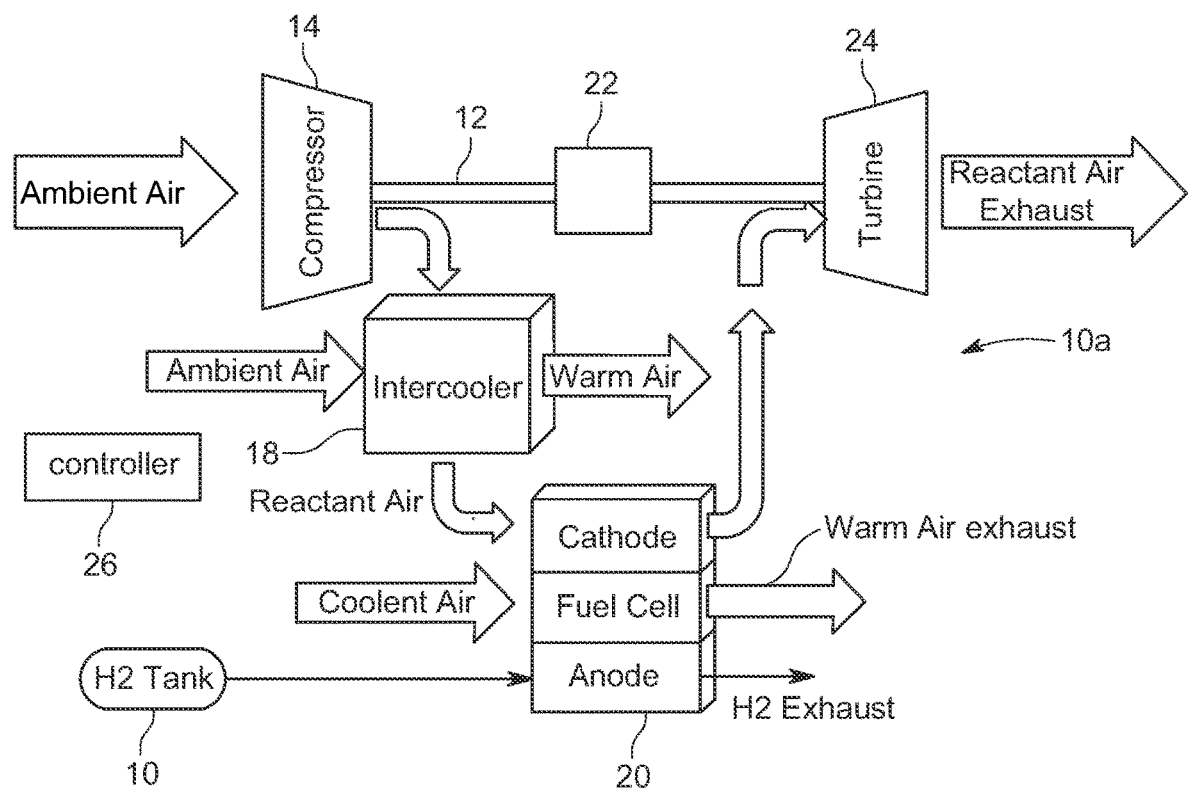
FIG. 2 is a schematic cross-sectional view of a hydrogen-electric engine system in accordance with another embodiment of the prior art.
Figure 3:
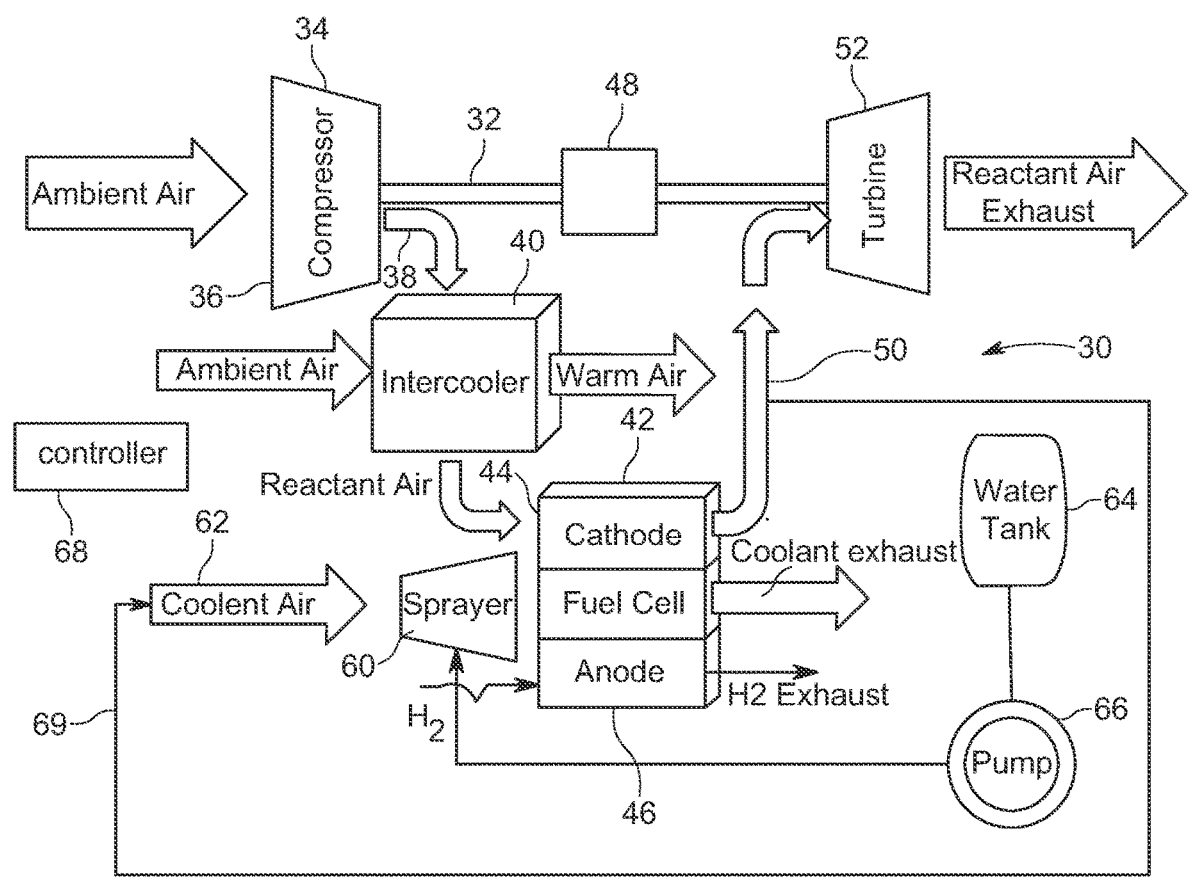
FIG. 3 is a cross-sectional view of an integrated hydrogen fuel-cell electric motor system in accordance with a first embodiment of the present disclosure.

FIG. 3 illustrates an integrated hydrogen gas fuel-cell electric motor system 30 in accordance with one embodiment of the present disclosure. System 30 includes an elongated shaft 32 that extends through the entire power train to function as a common shaft for the various components of the power train. Elongated shaft 32 supports a propulsor such as a fan or propellor (not shown) and a multi-stage air compressor system 34. Alternatively, shaft 32 may be replaced by one or more electric motors.

Air compressor system 34 includes an air inlet 36 at a front end thereof and an air outlet 38 coupled to a heat exchanger or intercooler 40 or directly to a HT-PEM fuel-cell stack 42 cathode inlet 44, where the air is reacted with hydrogen gas introduced to fuel-cell stack 42 via anode inlet 46 producing electricity for driving motor 48, and a cathode gaseous exhaust stream 50 which comprises primarily moist warm air typically containing 10-25 percent water vapor by mass which is exhausted via the cathode exhaust stream 50. The cathode exhaust stream preferably may be used to perform other useful work such as to drive a turbine 52. Up to this point, as described, the integrated hydrogen fuel-cell electric motor system 30 is conventional.

In accordance with the present disclosure, the fuel-cell stack 42 is directly cooled by circulating air containing liquid water droplets created by a spray system 60 mixed with a coolant air stream 62 through coolant channels (not shown) in the fuel-cell stack 42 as a coolant for the fuel-cell stack 42. Spray system 60 may comprise a conventional aerosol sprayer that may be powered, for example, with air provided by the fuel-cell system's air compressor. The air droplets also can be generated by atomizing high pressure nozzles, or via high pressure streams of water impinging on a surface or on one another. Water for forming the liquid water droplets is supplied from a water tank 64 via pump 66 under control of controller 68. The water droplets are formed by spraying water through atomizing nozzles or via high pressure streams as described above. A controller 68 controls operation of the fuel-cell including sprayer 60, based on operating requirements, power demand, fuel-cell temperature, ambient conditions, etc., based on, for example, sensor (not shown), and including specifically the amount of water droplets added, and water droplet size. Since large size water droplets may travel completely through the fuel-cell, droplet size preferably is controlled to an average particle size of 5 to 500 microns, preferably 5 to 100 microns, more preferably 5 to 20 microns.

As will be appreciated, the use of water in fuel-cells is limited to electrically isolated coolant passages since water is electrically conductive. However, by passing the water-air mixture through cooling channels formed by the BPPs which maintain the water separate from the inner workings of the fuel-cell in accordance with the present disclosure, the system is protected against electrical shorting from external liquid water. Moreover, rather than directly ejecting compressed cathode air flow as exhaust after being used as a reactant, a portion of the exhaust may be redirected from the cathode outlet via conduit 69 into cooling channels of the same stack.

In a preferred embodiment, the fuel-cell stack 42 comprises a plurality of fuel-cells electrically connected to one another in a stack, comprising a bipolar plate (BPP) formed of two layers of different materials, a metal base layer and a polymeric composite layer shaped with cooling channels configured to accommodate a circulating coolant according to the teachings of our co-pending UK Patent Application Serial No. 2303807.8, filed Mar. 15, 2023, the contents of which are incorporated herein in their entirety by reference. However, any fuel-cell stack formed with cooling channels configured for circulating a coolant through the fuel-cells may be employed.

Since the fuel-cell stack 42 is at a temperature higher than the dew point of the water-air mixture flowing through the cooling channels in the fuel-cell stack, the liquid water, both injected and produced by the fuel-cell changes into water vapor by phase transition or evaporation. In practice, water produced by the fuel-cell may comprise 10 to 25 mass percent of the air flow through the cell. Add to this water droplets sprayed into the air flow upstream of the cell, the air flow through the cell may equal 75 mass percent water. The phase transition absorbs significant heat from the air flow reducing and stabilizing the air flow temperature, while moisture laden air circulating through cooling channels in the fuel-cells absorbs heat from the fuel-cell channel walls, so that the water-air mixture functions as a coolant. Due to the high specific vaporization heat of water, the water-air mixture absorbs a significant amount of heat from the fuel-cell, and thus provides significantly more cooling and temperature uniformity than air by itself as in the case of prior art fuel-cell systems. The moisture laden coolant air is then exhausted from the fuel-cell stack 42.

Figure 4:
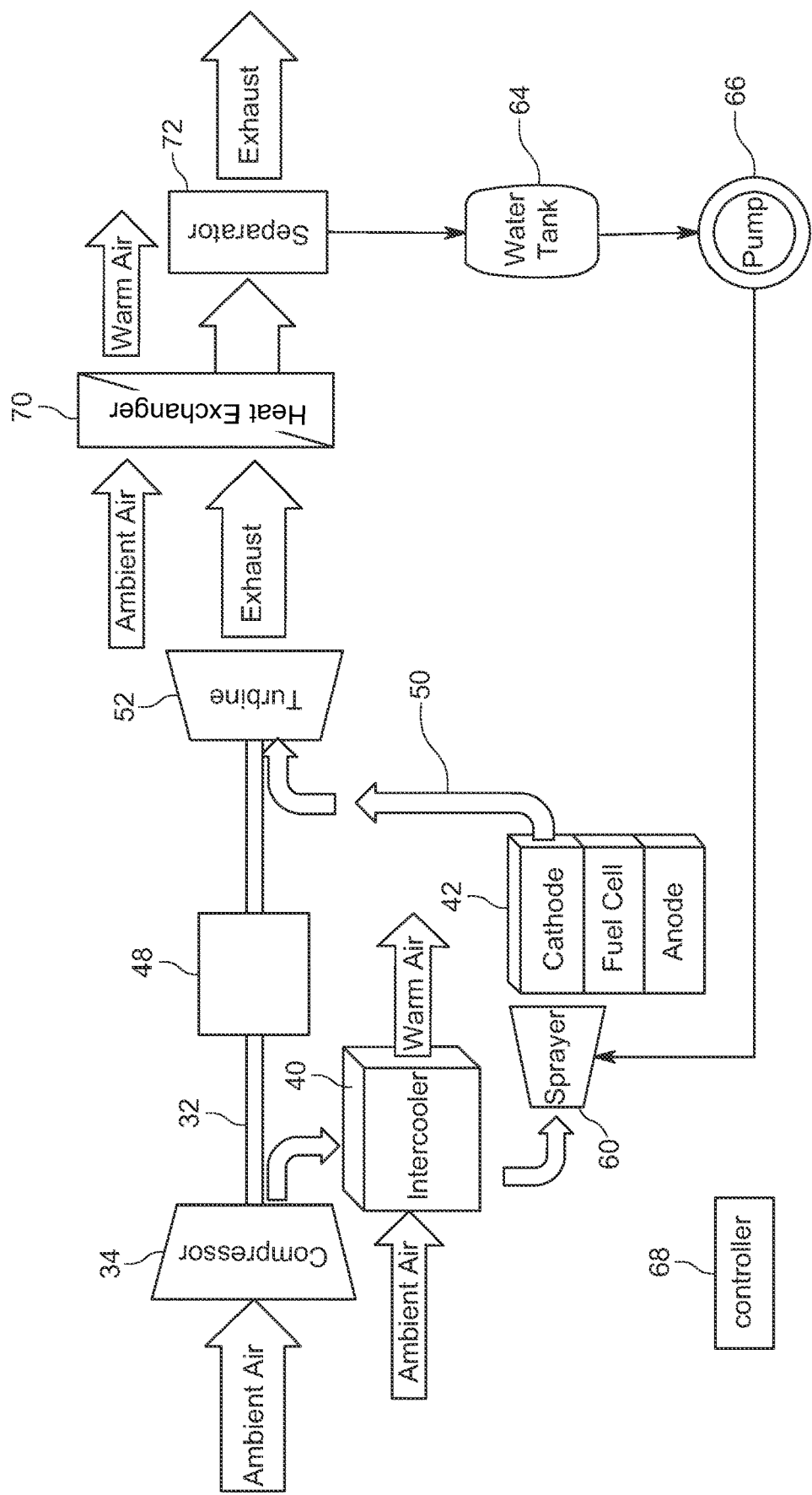
FIG. 4 is a schematic cross-sectional view of a hydrogen fuel-cell electric motor system in accordance with another embodiment of the subject disclosure.

Referring to FIG. 4, in another embodiment, liquid water is sprayed into the cathode reactant air from intercooler 40 before the cathode reactant air is introduced into the cathode side of the fuel-cell stack 42. As the liquid water passes through the fuel-cell cathode 44, the water absorbs heat through evaporation. After passing through the fuel-cell stack 42 and turbine 52, the water is recovered from the warm moist air exhaust for reuse by cooling the warm moist air to condense the water vapor, in an ambient air cooled heat exchanger 70, and the condensed water is separated in a water separator 72 such as a centrifugal separator, downstream of the turbine 52. The recovered liquid water is returned to water tank 64 for reuse.

Figure 5:
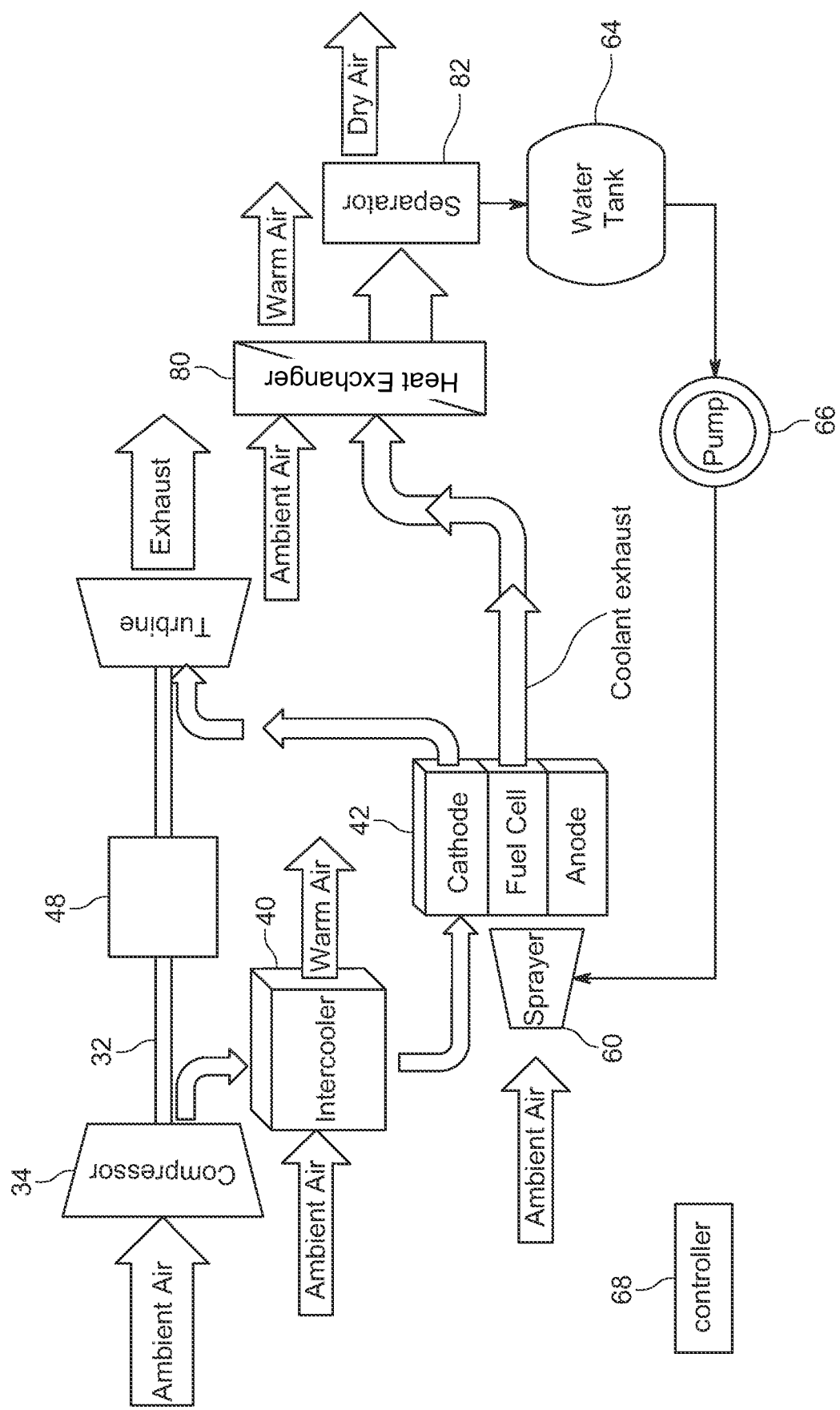
FIG. 5 is a schematic cross-sectional view of a hydrogen fuel-cell electric motor system in accordance with another embodiment of the subject disclosure.

Referring to FIG. 5, in yet another embodiment, the fuel-cell is cooled with air and water spray passing through cooling channels in the fuel-cell as in the FIG. 3 embodiment, the water is recovered from the warm air exhaust by cooling in an ambient air cooled heat exchanger 80 to condense the water vapor, and the condensed water is separated in a separator 82. The separated water is then passed to water tank 64 for reuse.

Figure 6:
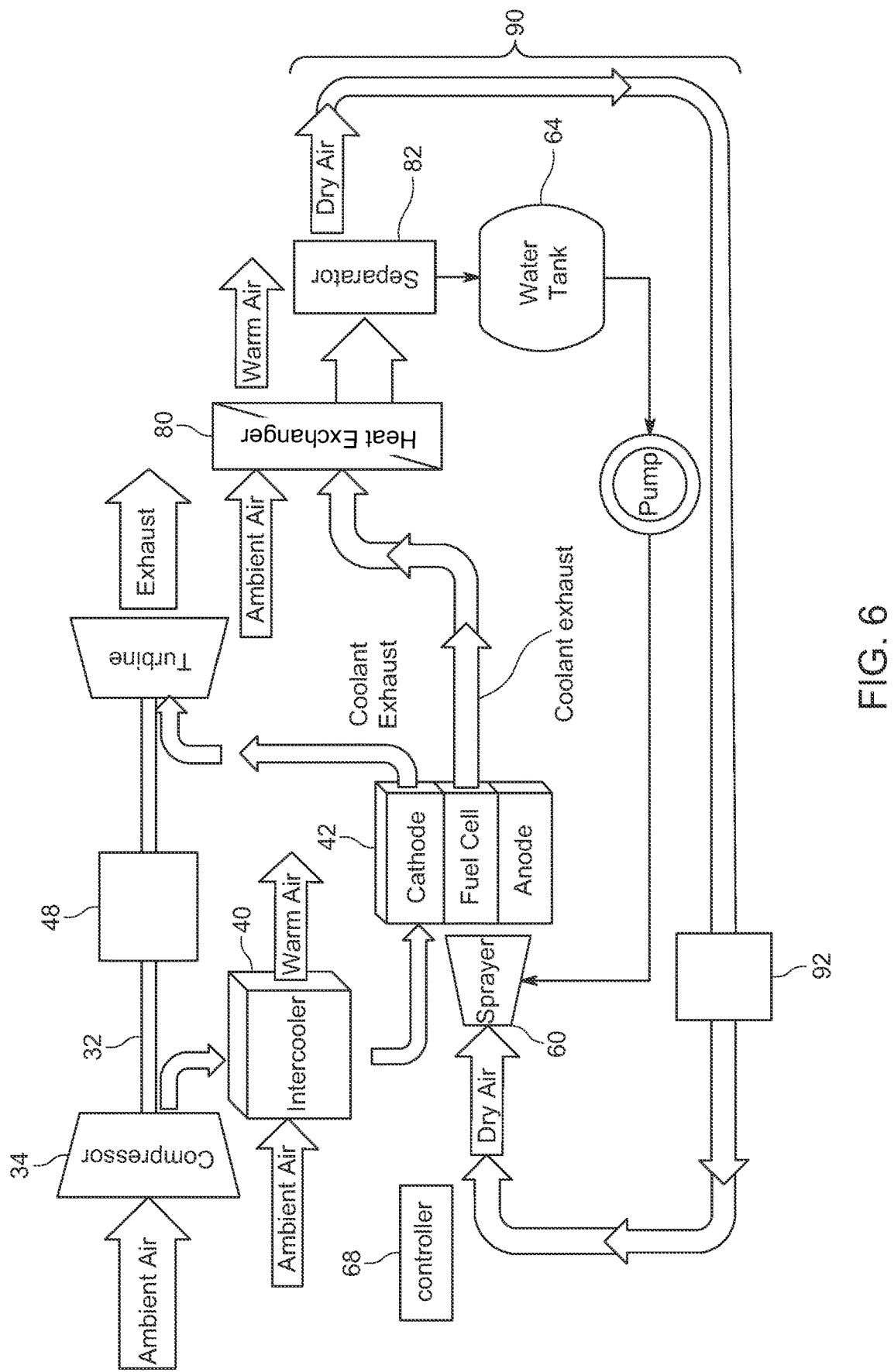
FIG. 6 is a schematic cross-sectional view of a hydrogen fuel-cell electric motor system in accordance with another embodiment of the subject disclosure.

Referring to FIG. 6, in still yet another embodiment, the dry air from water separator 82, is recirculated in a closed-loop coolant system 90 as feed air to the sprayer 60. Thus, unlike the open system of FIG. 5, in the FIG. 6 embodiment, all the water used in creating the water droplet containing cooling medium for cooling the fuel-cell is recovered and reused in a closed system 90. Thus, in this embodiment, a pump 92 is added for returning the air from water separator 82 to sprayer 60. The advantage of this system is that all the water used to form the water droplet containing cooling medium is recaptured and returned to the sprayer 60.

Figure 7:
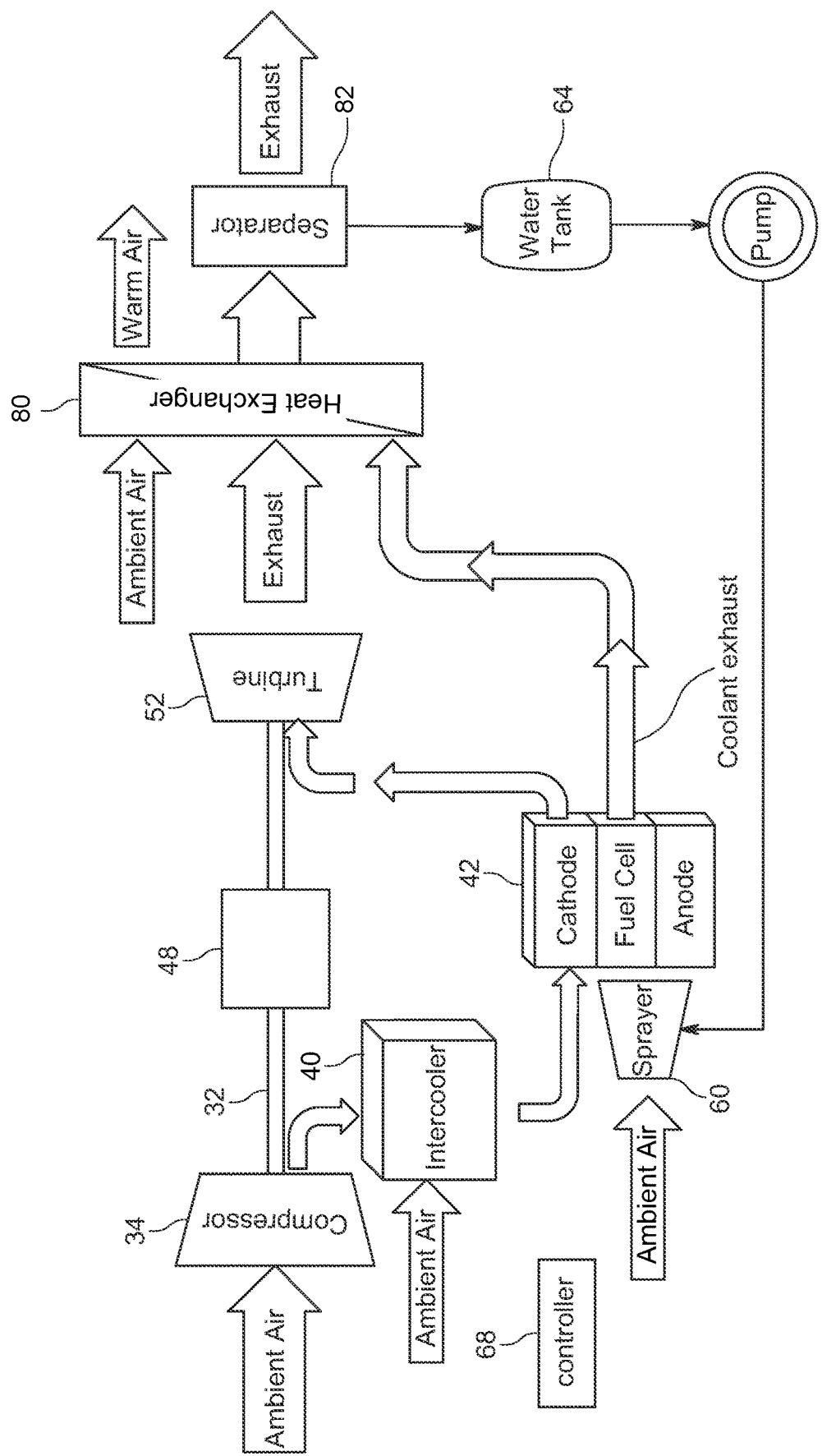
FIG. 7 is a schematic cross-sectional view of a hydrogen fuel-cell electric motor system in accordance with yet another embodiment of the subject disclosure.

Referring to FIG. 7, in still yet another embodiment, warm wet air recovered from the fuel-cell coolant passages and reactant exhaust are cooled in a heat exchanger 80, the water is condensed and separated in a water separator 82 and returned to the sprayer 60.

Figure 8:
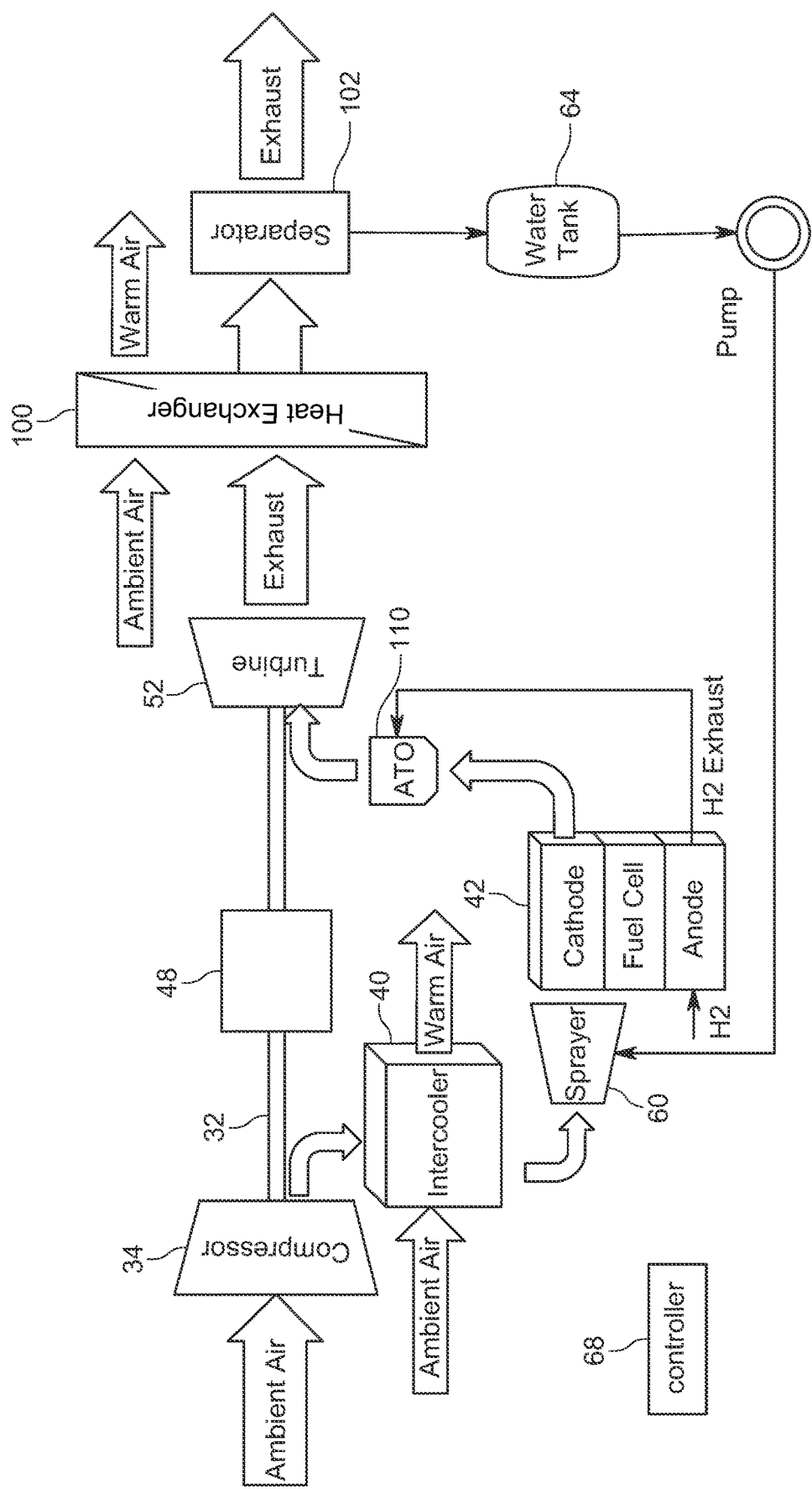
FIG. 8 is a schematic cross-sectional view of a hydrogen fuel-cell electric motor system in accordance with yet another embodiment of the subject disclosure.

Referring to FIG. 8, in still yet another embodiment, the fuel-cell anode exhaust, while still at elevated pressure, is passed to an ATO 110, which includes a catalyst and/or burner to combust any unreacted hydrogen gas in the anode exhaust. The resulting exhaust from the ATO 110, which includes moisture produced by combustion of the hydrogen gas in the ATO, is then combined with the cathode exhaust and passed to the turbine 52. After passing through turbine 52, the mixed exhaust is then passed through heat exchanger 100 and from there to water separator 102 wherein water in the combined exhaust is condensed and separated to replenish the water supply in water tank 64.

Figure 9:
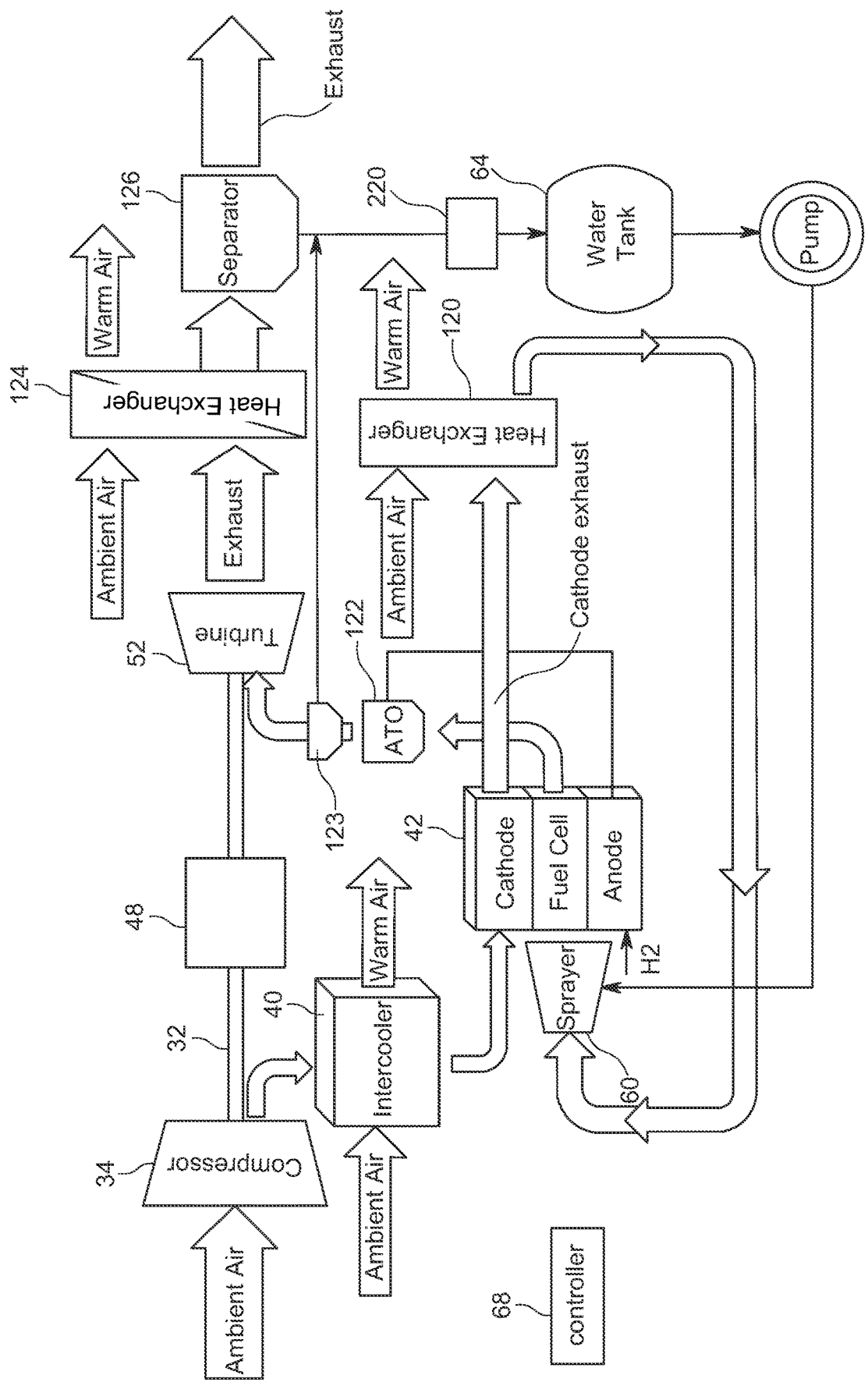
FIG. 9 is a schematic cross-sectional view of a hydrogen fuel-cell electric motor system in accordance with yet another embodiment of the subject disclosure.
Figure 10:
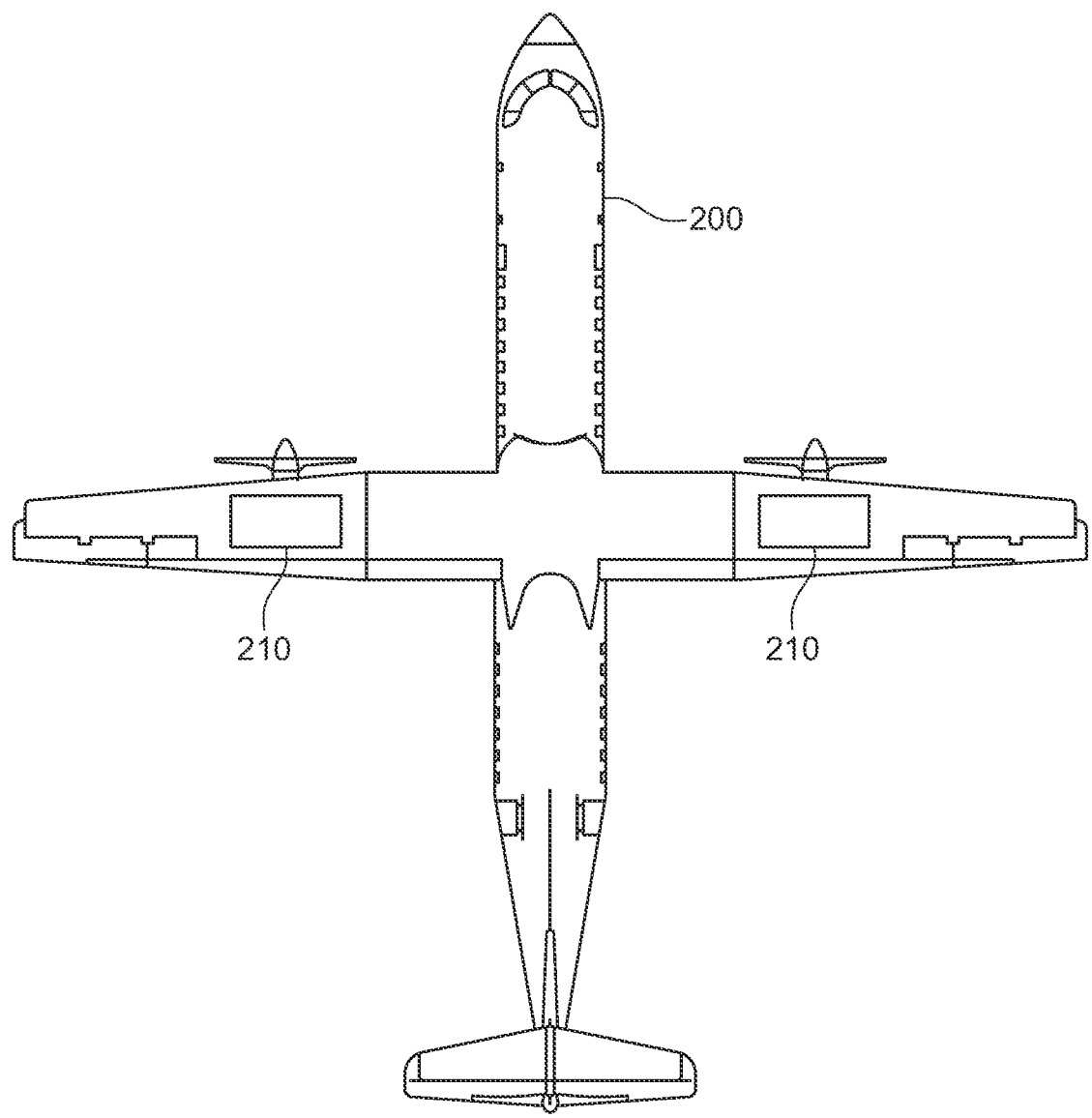
FIG. 10 is a schematic depiction of an aircraft incorporating the hydrogen fuel-cell electric motor system of FIG. 9.

Referring to FIG. 9, in still yet another and preferred embodiment, the cathode reactant gases, while still at elevated temperature and pressure are cooled by a heat exchanger 120. Since the cathode reactant gases are at elevated pressure, heat exchanger 120 may be smaller for example than heat exchanger 100 of FIG. 8 because it is acting on denser fluids than if the reactant gas had been allowed to expand. The cooled reactant gas, which comprises moist air is passed as feed to the sprayer 60 where additional water in the form of droplets is sprayed into the moist air, which is then used as the coolant for the fuel-cell stack 42. The higher density of the water droplet-containing moist air provides higher specific heat extraction capability for each unit of area in the fuel-cell cooling passages. As before, while passing through the fuel-cell coolant passages, the liquid water in the coolant stream is evaporated, extracting heat from the fuel-cell. The coolant exhaust is then introduced into an ATO 110 where it is further heated by combustion of unreacted hydrogen gas in the anode exhaust. A water separator 123 may be included upstream of the ATO. The anode exhaust is then directed through turbine 52 to extract mechanical work from the hot, high-pressure gases from the ATO. After passing through the turbine 52, the exhaust gases are cooled in a heat exchanger 124 causing condensation of the water vapor to liquid. The liquid water is then separated in a water separator 126, for example a centrifugal separator, and then collected in water tank 64. The collected stored water is then re-used in sprayer 60. As before, controller 68 regulates the amount of water sprayed so as to maintain adequate cooling, and to avoid liquid water passage through the turbine which could cause erosion or corrosion of the turbine components.

In a preferred embodiment, the ambient air pressure is 0.25 to 0.50 Bar, and the pressure of the cathode inlet reactant gases is 2-3 Bar and temperature of the reactant exhaust gases is 150° to 200° C. The cathode reactant exhaust gases typically contain 10-25% water vapor by mass. The cathode reactant heat exchanger reduces the exhaust gas temperatures to 70°−80° C. The heat exchanger and water separator remove 60-72% or more of the water in the exhaust, enabling continuous operation without water replenishment.

FIG. 10 illustrates an aircraft 200 including an integrated fuel-cell-electric engine system 210 including a cooling system in accordance with the present disclosure.

While the drawings show the compressor and turbine mechanically coupled, this is not intended to be limiting. The compressor may be independently powered by the turbine. Also, the compressor and turbine both may be operated by motor/generators and electrically coupled. The power for the compressor and pump motors may be supplied by the fuel-cell electrical output, or by other sources.

There may also be other features interposed between the components shown in the drawings. For example, a water purification or filtration system may be used between the water storage tank and the pump or controller.

As will be appreciated, the instant disclosure has several advantages over existing fuel-cell systems. While existing fuel-cell phase transition cooling systems rely solely on evaporative media (coolant fluid) that instantly boils in contact with the bipolar plate, the present disclosure combines evaporative media (i.e., water) with gaseous media (i.e., air) in order to move the operating temperature (200° C.) well over the boiling point of water (100° C.), by employing evaporating media of water droplets and the gaseous media of air mixed to form a water-air mixture for cooling.

A feature and advantage of the fuel-cell cooling system in accordance with the present disclosure is a much more uniform cooling of the fuel-cell stack that results from the injection of water droplets and introduction of water droplets into the cooling media to directly cool the fuel-cell.

Moreover, this cooling effect is particularly advantageous when used for powering aircraft at higher altitudes. For example, at an altitude of 25,000 feet, the air needs to be compressed by 7 times to achieve the 2.5 bar required for fuel-cell compatibility. Compressing air by 7 times at such altitude raises the temperature of the ambient air from −55° C. to +200° C.

As a result, coolant properties which traditionally have limited stack power capacity of conventional fuel-cell stacks are greatly increased. Air-cooling in the case of conventional fuel-cell stacks limits the stack depth so height and width cannot be varied without keeping the depth the same. Reactant flow dynamics also imply limits. By way of example, a 100 kW air-cooled stack of 160 cells might have dimensions of 500 mm by 300 mm by 100 mm (height×width×depth). In another example, a 55 kW stack of 300 air-cooled cells might have dimensions of 1000 mm by 500 mm by 120 mm. With the instant disclosure a 100 KW air-cooled stack would have the same depth as a 55 kW stack but would have increased the height and width. Capacity could be further increased by increased stack depth.

It is thus seen that the present disclosure provides significant advantages over prior art air-cooled stacks. These advantages include increased fuel-cell scaling—350 kW+stack power capacity given better cooling—less temperature gradient and smaller coolant flow rate. Air works as a mediator between the BPP and the water droplets so that the process of heat rejection is more evenly distributed along the fuel-cell. Higher volumetric power density enables more compact balance of plant and stack design. This in turn results in an operating altitude of 40,000 ft or more since the compressor enables constant air pressure.

Figure 11:
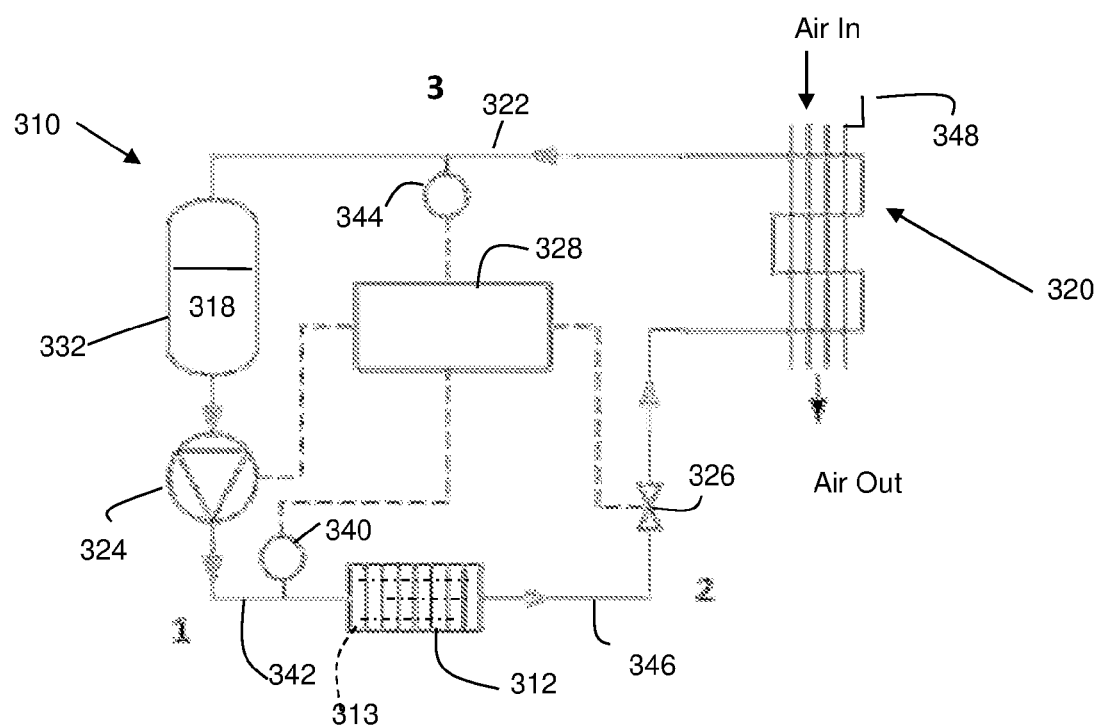
FIG. 11 is a flow diagram of a cooling system for a hydrogen fuel-cell in accordance with another aspect of the present disclosure.
Figure 12:
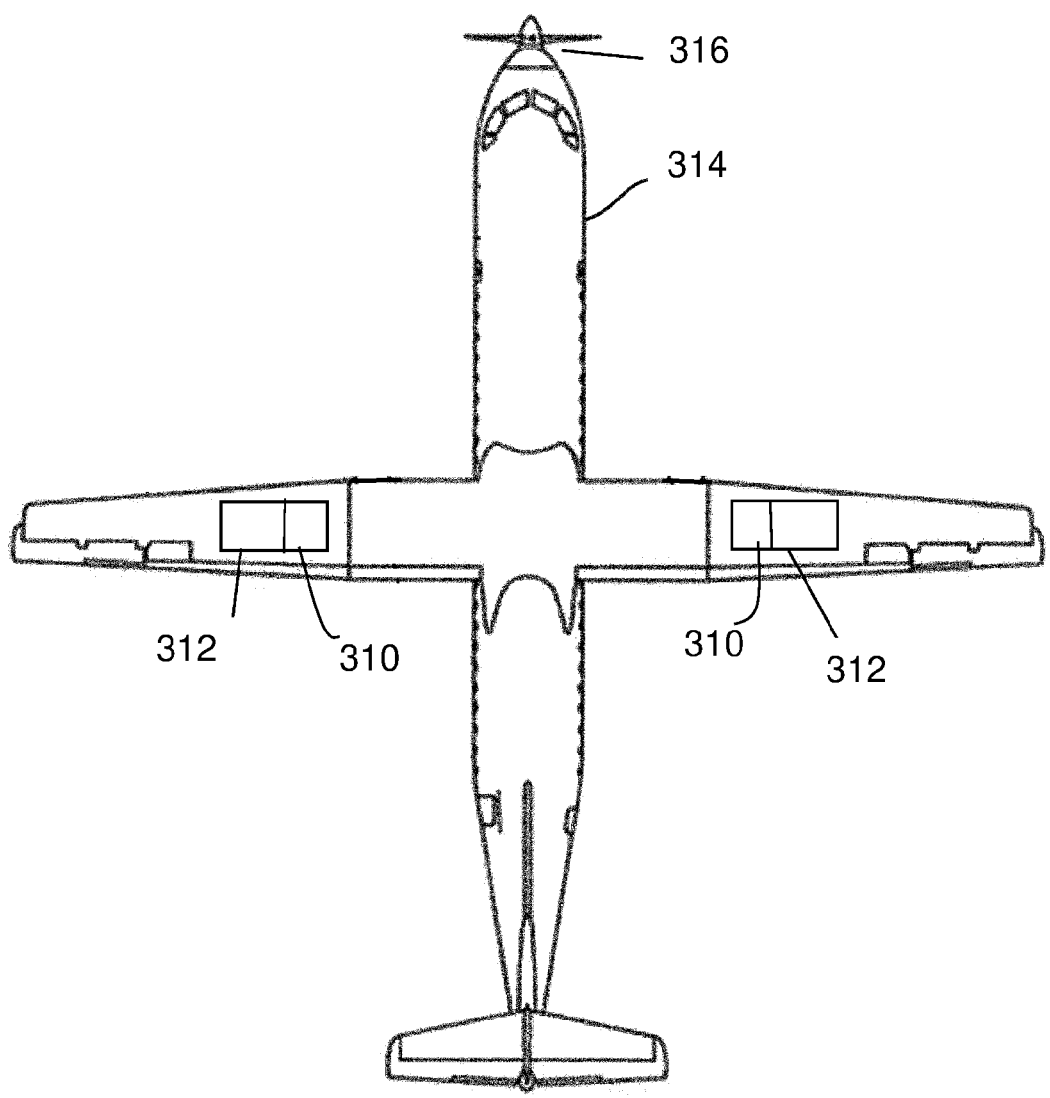
FIG. 12 is a schematic depiction of an aircraft including a fuel-cell and fuel-cell cooling system onboard the aircraft in accordance with another aspect of the present disclosure.

FIG. 11 depicts a process flow diagram of a cooling system 310 for a hydrogen fuel-cell or fuel-cell stack 312 in accordance with the present disclosure. The hydrogen fuel-cell or fuel-cell stack 312 is located on board an aircraft 314 as shown in FIG. 12 that is powered at least in part by an electric motor 316. While the fuel-cell or fuel-cell stack 312 is illustrated as being located in the wings of the aircraft 314, the fuel-cell or fuel-cell stack also may be disposed in the fuselage, engine nacelle, or any other part of the aircraft. The cooling system 310 includes a heat exchanger system as shown in FIG. 11, configured to extract heat from the fuel-cell or fuel-cell stack 312, for example, by contact with the fuel-cell or fuel-cell stack, e.g., through cooling channels shown in phantom at 313 in the fuel-cell or fuel-cell stack 312 transferring waste heat generated by the fuel-cell or fuel-cell stack 312 to a cooling medium, that includes coolant 318, an air-cooled heat exchanger 320, conduits 322, pump 324 and valve 326 under control of a controller 328 for circulating the coolant 318 through a heat exchanger 320 in contact with the fuel-cell or fuel-cell stack 312 to absorb heat from the fuel-cell or fuel-cell stack 312, and through air heat exchanger 320 into a coolant buffer tank 332. The cooling system is configured, sized, and controlled to accommodate cooling requirements of the fuel-cell or fuel-cell stack 312 during cruise as well as peak power operation of the vehicle, i.e., takeoff and climb, as will be described below. In other embodiments, cooling channels 313 may be disposed within a heat exchanger which is thermally coupled to fuel-cell stack 312.

Referring again to FIG. 11, the cooling system incorporates a first sensor 340 in line 342 connecting pump 324 with fuel-cell or fuel-cell stack 312. Sensor 340 is followed downstream of fuel-cell or fuel-cell stack 312 by throttling valve 326. Sensor 340, throttling valve 326 and pump 324 are all connected to controller 328. In operation, subcooled liquid coolant is flowed through the fuel-cell or fuel-cell stack 312 to cool the stack. Controller 328 receives temperature and pressure data of the coolant in line 342 from sensor 340 and is configured to regulate pump 324 and valve 326 to control the evaporation temperature of the coolant by altering the pressure and accordingly the boiling point of the coolant flowing though the fuel-cell or fuel-cell stack 312. Saturated vaporized coolant exits the fuel-cell or fuel-cell stack 312 and is passed via line 346 to air cooled heat exchanger 320 in which heat is extracted from the hot vaporized coolant, and the coolant condensed to liquid which is then passed via line 322 to coolant buffer tank 332.

Controller 328 also receives temperature readings from sensor 344 upstream of the fuel-cell or fuel-cell stack 312 and is configured to regulate throttling valve 326 to match the saturation temperature of the coolant, to target fuel-cell or fuel-cell operating stack set point temperature. In so doing we can assure substantially equal cooling across the fuel-cell or fuel-cell stack 312. That is to say, the system is arranged so that the fuel-cell stack cooling channels act as an evaporator receiving subcooled liquid coolant from the pump 324. Heat from the fuel-cell or fuel-cell stack 312 will warm the coolant to its boiling point and partially or completely evaporate the coolant so that it exits the stack cooling channels as either a two-phase mixture or a superheated vapor. The now hot coolant is passed to the heat exchanger 320 which may be cooled by air or other means where it condenses back to a subcooled liquid. From the heat exchanger 320 the coolant is circulated to the coolant buffer tank 332 which serves as a vapor separator and coolant buffer to ensure no vapor enters the pump. The use of a two-phase coolant exploits the latent heat of vaporization to reduce the required coolant flow rates, pump size, tube, and coolant volume. A further benefit is that evaporation through the fuel-cell stack will provide better temperature uniformity and higher possible convective heat transfer coefficient making the heat transfer from/to coolant more efficient.

Also, by controlling coolant pressure, the air inlet 348 of the heat exchanger 320 can be closed during cruise to reduce drag. Controller 328 receives temperature from temperature sensor 340 located between pump 324 and cooling channels 313. As temperature of the coolant approaches ambient temperature, the air inlet 348 of the heat exchanger 320 can be closed and/or reduce mass flow of the coolant pump 324 to reduce drag and/or power consumption, respectively.

The below Table 1 illustrates the advantages of the use of a two-phase cooling system in accordance with the present disclosure over a single-phase system. Estimation of cooling flow and pumping requirements for single and two-phase systems.

TABLE 1

|  | Single Phase | Two Phase |
|---|---|---|
| Thermal power (kW) | 1800 | 1800 |
| Coolant | 60/40 EGW | Novec 649 |
| Coolant density (kg/m3) | 1050 | 1419 |
| Coolant specific heat (kJ/kg) | 3.3 | 0.95 |
| Latent heat (kJ/kg) | N/A | 78.0 |
| FC inlet temperature (° C.) | 68 | 68 |
| FC outlet temperature (° C.) | 80 | 80 |
| Effective heat capacity (kJ/kg) | 39.8 | 89.4 |
| Coolant mass flow (kg/s) | 45.5 | 20.1 |
| Coolant volume flow (m3/s) | 0.043 | 0.014 |
| Coolant volume flow (L/min) | 2597 | 851 |
| Pump pressure differential (Bar) | 2.5 | 1 |
| Pump efficiency (—) | 0.5 | 0.5 |
| Pump absorbed power (kW) | 21.6 | 2.8 |
| Power reduction single>two phase (%) |  | 87% |

FIG. 15 is a block diagram showing operation and control of cooling system 310 in accordance with the present disclosure. The controller 328 is configured to receive input including outside air temperature, fuel-cell power requirements, fuel-cell temperature, and coolant temperature and pressure from sensors 340 and 344, and controls pump 324 and throttling valve 326 to increase pressure on the coolant to increase the coolant boiling point to maintain the fuel-cell stack at a desired operating temperature. Also, controller 328 may control the air inlet 348 of the heat exchanger 320 to reduce drag, e.g., during cruise, when cooling demands are reduced, or when temperature of the coolant approaches ambient temperature.

WORKING EXAMPLE

FIGS. 13 and 14 graphically illustrate takeoff and cruise conditions of a fuel-cell powered aircraft equipped with a two-phase coolant controlled in accordance with the present disclosure at locations 1, 2 and 3. FIG. 13 illustrates NOVEC™649 as coolant @ 1800 kW for takeoff:
Evaporator inlet ~62° C., 2.8 Bar
Evaporator outlet=FC temperature (~85° C.)
Condenser inlet ~85° C., 2.5 Bar
Condenser outlet=saturation temperature −3° C.
Ambient temperature 30° C.
303K ambient
358K fuel-cell
~2.5 KW pumping power Novec 649, Q=1800 KW, mdot=17.5 kg/s FIG. 14 illustrates takeoff and cruise conditions at locations 1, 2 and 3 for NOVEC™649 as a coolant @ 900 kW 18,000 ft for cruise:

Evaporator inlet ~54° C., 1.85 Bar
Evaporator outlet=FC temperature (~70° C.)
Condenser inlet ~54° C., 1.7 Bar
Condenser outlet=saturation temperature−3° C.
Ambient temperature −20° C.
253K ambient
343K fuel-cell
~0.6 kW pumping power
Novec 649, Q=900 KW, mdot=9.0 kg/s As will be seen from the foregoing, the use of a two-phase coolant in accordance with the present disclosure exploits the latent heat of vaporization to reduce the required coolant flow rates, pump size, tube, and coolant volume of the cooling system for an onboard fuel-cell powered vehicle. A further benefit is that evaporation through the fuel-cell stack will provide better temperature uniformity and higher possible convective heat transfer coefficient making the heat transfer from/to coolant more efficient.

Other benefits include reduction in mass and parasitic power of cooling system components, and improved temperature uniformity in fuel-cell stack and heat rejection equipment (e.g., radiators), and improved temperature range (e.g., MT/HT PEM).

FIG. 16 depicts a process flow diagram of a cooling system 410 for a hydrogen fuel-cell or fuel-cell stack 412 in accordance with the present disclosure. The fuel-cell or fuel-cell stack 412 is located on board an aircraft 414 as shown in FIG. 21 and the aircraft is propelled at least in part by an electric motor 416. While the fuel-cell or fuel-cell stack 412 is illustrated as being located in the wings of the aircraft 414, the fuel-cell or fuel-cell stack also may be disposed in the fuselage, engine, nacelle, or any other part of the aircraft.

The cooling system 410 includes a primary ambient air heat exchanger coolant loop 418 including a heat exchanger 420 configured to extract heat from a fuel-cell or fuel-cell stack coolant. The fuel-cell stack assembly is configured for transferring waste heat generated by fuel-cell or fuel-cell stack 412 to a cooling medium which is circulated through fuel-cell 412 and heat exchanger 420 via conduits 424, 426 and pump 428. Valve 432 and/or pump 428 which is included in line 426, is under control of controller 500 illustrated in FIG. 22.

An auxiliary or secondary heat exchanger coolant loop 436 in thermal contact with a PCM 460 is independently connected to the fuel-cell 412 via conduits 444, 446 and pump 448 which circulates a fluid coolant through the fuel-cell 412 and in thermal contact with the PCM 460 in heat pump 454. Valves 450 and 452, and pump 448 also are under control of controller 500. Secondary heat exchanger coolant loop 436 optionally includes heat pump 454 which is electrically driven by electricity from fuel-cell 412, and also is controlled by controller 500.

Referring to FIG. 17 in another embodiment, the secondary heat exchanger loop 436a includes a heat pump 454 powered by electric power from fuel-cell 412 and also a second ambient air heat exchanger 456 for cooling the PCM 460 (via a fluid coolant).

Referring to FIG. 18a, in yet another embodiment, the PCM coolant is circulated through to the primary ambient air heat exchanger coolant loop 418 used for the fuel-cell 412 and additionally is cooled by heat pump 454. The PCM is isolated by valves 462, and/or 464 when not in use. As before, the heat pump 454 is powered by electricity from fuel-cell 412, and pump 428 and valves 462, 464 are controlled by the controller 500. In other embodiments, the coolant can also be selectively pumped through heat exchangers by operation of pumps, with or without valves.

Alternatively, as shown in FIG. 18b, the PCM coolant can be circulated through the same ambient air heat exchanger coolant loop 418 used by the fuel-cell 412 and ambient air heat exchanger 420. When excess heat is produced by the fuel-cell 412 and is not completely dissipated by the ambient air heat exchanger 420, the PCM can absorb excess heat. As before, the PCM is in turn cooled via a heat pump 454, which is powered by the fuel-cell.

Alternatively, as shown in FIG. 18c, the PCM also can be used to adjust or modify the temperature of the fuel-cell system, for example, to warm the fuel-cell at startup, by running the heat pump 454 in reverse. The PCM 460 also may be bypassed by valves 470, 472. Not shown is a coolant reservoir typically at the outlet of the ambient air heat exchanger 420. Controller 500 can operate pump 428, and or valves 432, 470, 472, and heat pump 454. In this and other embodiments, the controller may be programmed to alter the system behavior to suit various operating conditions.

Referring to FIG. 19 in yet another embodiment, a separate ambient air heat exchanger 420A is provided dedicated for cooling heat pump 454. Alternatively, the two ambient air heat exchangers 420, 420A can be combined into one component, and PCM coolant flow from the heat pump 454 is added in series with heat from the fuel-cell 412 and combined in the ambient air heat exchanger 420. Preferably, the ambient air heat exchanger 420 is located immediately downstream from the fuel-cell 412. As illustrated in the previous figures, valves are provided configured to bypass any of the components as may be required based on operating conditions. Also, air flow through the heat exchangers may be modulated, e.g., via baffles (not shown) to reduce aerodynamic drag when less than full cooling capacity is required.

Referring to FIG. 20a, in yet another embodiment, a heat pump 520 is disposed between the fuel-cell coolant loop 522, 524 and the ambient air heat exchanger 420. This allows heat to be pumped in either direction between the phase change material and the coolant loop, while also allowing the fuel-cell and phase change media to operate at different temperatures. Thus, during startup, the fuel-cell 412 can be heated while also chilling the PCM. As before electric power for the heat pump may be supplied by the fuel-cell. Alternatively, as shown in FIG. 20b, a bypass valve 526 and conduit 528 may be added to allow heat from the fuel-cell 412 to be delivered to the heat pump without passing through the ambient air heat exchanger 420. This operating mode may be used when heating the phase change material. In place of proportional valves, pumps 428a, 428b also may be operated independently to deliver fractions of the PCM coolant to various coolant paths.

Various changes may be made without departing from the spirit and scope of the disclosure. For example, referring to FIG. 16, electrical power for the heat pump 454 may be supplied at least in part from an auxiliary power supply such as an onboard battery, a ground base electricity energy cart, a ground based electrical energy grid, or regenerative power produced by vehicle braking (in the case of a land based vehicle) or propeller/motor braking during descent (in the case of a fuel-cell powered aircraft). Alternatively, the heat pump 454 may be mechanically driven by an onboard mechanical power service, or by an absorption refrigeration cycle, for example, from hot exhaust from the fuel-cell or an onboard compressor. An advantage of an absorption refrigeration cycle is that it is light weight and has no moving parts. Also, excess hydrogen fuel could be used to generate electricity specifically for cooling the PCM, i.e., permitting further time shifting of thermal management requirements. Plus, the evaporation of liquid $H_2$ fuel absorbs heat, which also can be captured to further chill the PCM.

A feature and advantage of the use of a PCM and heat pump in accordance with the present disclosure is that it permits reduction of the size and mass of the necessary heat exchanger for cooling the fuel-cells as compared to conventional ambient air heat exchangers. Also, the disclosure makes use of excess electric power (or excess mechanical energy or thermal energy) to chill the PCM when excess power is available, in essence time-shifting the cooling of the fuel-cell, which in turn increases the payload or range of a fuel-cell powered vehicle.

FIG. 23 depicts a process flow diagram of a cooling system 610 for a hydrogen fuel-cell 612. The hydrogen fuel-cell or fuel-cells 612 are located on board an aircraft 614 as shown in FIG. 24 that is powered at least in part by an electric motor 616. While the fuel-cell or fuel-cells 612 are illustrated as being located in the wings of the aircraft 614, the fuel-cell(s) also may be disposed in the fuselage, engine nacelle, or any other part of the aircraft. The cooling system includes a conventional heat exchanger system configured to extract heat from the fuel-cell(s) 612, for example, by transferring waste heat generated by the fuel-cell(s) 612 to a cooling medium, that includes coolant 618, an air heat exchanger 620, conduits 622, pumps 624 and valves 626 under control of a controller 628 for circulating the coolant 618 through a heat exchanger 630 in contact with the fuel-cell 612 to absorb heat from the fuel-cell 612, and through air heat exchanger 620 into a coolant buffer tank 632. The conventional cooling system preferably is configured and sized to accommodate cooling requirements of the aircraft 614 below that required for peak power operation of the vehicle.

A feature and advantage of the current disclosure is to provide auxiliary cooling capacity to remove excess waste heat generated by the fuel-cell(s) during high load conditions, i.e., takeoff and climb. To accomplish this, we provide an auxiliary cooling system to supplement the conventional cooling system, that employs waste heat from the fuel-cell(s) 612 to pressurize the fuel-cell system gasifier 634 and/or intermediate tanks 636 to working pressure, and/or to boil off and release (purge) 638 resulting excess gaseous hydrogen safely behind the aircraft.

Referring again to FIG. 23, the auxiliary cooling system incorporates the fuel-cell system liquid hydrogen tank 640 connected via a pump 642 to the gasifier 634. Liquid hydrogen tank 640 is designed to hold liquid hydrogen at ambient pressure. The liquid hydrogen is flowed via conduits 644 and pump 642 into the gasifier 634, where the liquid hydrogen is converted to gas, taking heat out of the system, and the liquid hydrogen is boiled resulting in gaseous hydrogen at working pressure for the fuel-cell 612 by excess heat extracted from the fuel-cell(s) 612 by heat exchanger 630. The gaseous hydrogen is then passed to the fuel-cell 612 where it is reacted with oxygen fed via inlet 646. The amount of hydrogen and oxygen fed into fuel-cell 612 is controlled by valves 648 and 650. Excess gaseous hydrogen from gasifier 634 may be passed to accumulator tank 636 which in some embodiments comprises a variable volume tank such as a balloon or bellows tank. Alternatively excess gaseous hydrogen may be purged behind the aircraft at 638.

FIG. 25 is a block diagram showing operation and control of the cooling system 610 (FIG. 23) in accordance with the present disclosure. The cooling system 610 includes a controller 628 that receives input of various aircraft operating conditions and environment conditions including outside air temperature, fuel-cell power requirements, fuel-cell temperature, liquid hydrogen level, temperature and pressure, etc., provided by sensors 660A, 660B, 660C . . . and controls the pumps 624, 642 and valves 626 and 648, to maintain the fuel-cell(s) 612 at desired operating temperature.

WORKING EXAMPLE

A Bombardier Q400 was converted to an electric powered aircraft by replacing the conventional hydrocarbon powered engines and fuel tanks, etc., with electronic motors powered by hydrogen fuel-cells. The fuel tanks were filled with 500 kg of liquid hydrogen at 1 bar. The fully fueled plane required ~6 MW of aircraft-level power for takeoff for 120 seconds. An auxiliary cooling system in accordance with the subject disclosure was designed to provide about 30% of the takeoff cooling requirements, i.e., about ~70 KWH of heat (assuming 40% net powerplant efficiency at maximum power). To absorb 70 kwh with $H_2$ evaporation and heating to working pressure (350K) requires ~40 kg of $H_2$ in excess of what would have been used by the fuel-cell electric powerplant to produce the corresponding mechanical propulsion output. If stored onboard at 350 bar, that would require 1.5 $m^3$ and 400 kg of tank system-compared with about 7 $m^3$ for the primary liquid hydrogen storage weighing 1,100 kg. If $H_2$ is released, the additional weight requirement (extra $H_2$+additional tank weight to cover that) is about 100 kg.

For comparison, a fuel-cell powered aircraft having a conventional paraffin-based phase-change heat exchanger system would require 1,000 kg of paraffin alone (at 250 J/g standard heat of fusion plus heating for 30-50° C.). A similarly sized water ice-based phase change heat exchanger system (that would require ground pre-cooling) would require 400 kg of ice, and 800 kg if liquid water is used (no ice and no pre-cooling).

Thus, even taking into account the added weight of the increased size liquid hydrogen storage tank and other elements of the auxiliary coolant system of the present disclosure, the net result is a substantial weight saving by eliminating the need for other conventional coolants.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. By way of example, but not limitation, features from various of these embodiments of FIGS. 3-7 may be combined. For example, the air supplied to the cathode at elevated pressure may have liquid water added by one sprayer. A second sprayer may add liquid water to the coolant air at ambient pressure passing through the fuel-cell. The water recovered by a heat exchanger, condenser, and separator could include recycled coolant water as well as water formed in the reaction of hydrogen and oxygen within the fuel-cell. The condenser function may be combined with the heat exchanger and or separator. Also, the system optionally may include a mechanism 220 (FIG. 9) such as one or more filters, ion exchange mechanism or the like to purify the captured water before it is recycled, or alternatively collected for other uses. The same may also be varied in many ways. Such variations are not to be regarded as a departure from the disclosure, and all such modifications are intended to be included within the scope of the disclosure. Various changes and advantages may.

What is claimed:

1. A cooling system for a fuel cell aboard a vehicle, wherein the cooling system comprises a fluid circuit configured to circulate a coolant comprising a phase-change material through a coolant channel in contact with the fuel cell to absorb heat from the fuel cell;
    a heat exchanger comprising an extension of the coolant channel and an airflow channel connecting an air inlet and an air outlet, wherein the extension of the coolant channel is separated from the air flow channel;
    a pump configured for pressurizing and circulating the coolant through the system;
    a throttling valve for controlling pressure on the coolant as the coolant is circulated through the system, wherein the coolant has a boiling point that is below the fuel cell operating temperature, and
    a controller configured to control operation of the pump and the throttling valve to evaporate the coolant so that the coolant exits contact with the fuel cell as a two-phase mixture or as a vapor,
    wherein the air inlet to the heat exchanger is configured to close at least in part when the temperature of the coolant exiting the heat exchanger approaches ambient temperature.

2. The cooling system of claim 1, wherein one or more sensors upstream of the heat exchanger for detecting temperature and/or pressure of the coolant entering the heat exchanger.

3. The cooling system of claim 1, wherein a coolant buffer tank is configured to hold liquid coolant between the outlet of the heat exchanger and the pump.

4. The cooling system of claim 1, wherein the coolant has a boiling point at 2 to 3 bar pressure that is 2 to 10° C. below the fuel cell operating temperature.

5. The cooling system of claim 1, wherein the coolant is circulated through cooling channels in the fuel cell.

6. The cooling system of claim 1, wherein the vehicle comprises a fuel cell powered aircraft.

7. A method of cooling a fuel cell aboard a vehicle, comprising the steps of:
    providing a cooling system comprising:
        a fluid circuit configured to circulate a coolant through a coolant channel comprising a phase-change material in contact with the fuel cell to absorb heat from the fuel cell;
        a heat exchanger comprising an extension of the coolant channel and an airflow channel connecting an air inlet and an air outlet, wherein the coolant channel is separated from the air flow channel;
        a pump configured for pressurizing and circulating the coolant through the system;
        a throttling valve for controlling pressure on the coolant as the coolant is circulated through the system, wherein the coolant has a boiling point that is below the fuel cell operating temperature, and
        a controller configured to control operation of the pump and the throttling valve to evaporate the coolant so that the coolant exits contact with the fuel cell as a two-phase mixture or as a vapor,
    sensing the temperature of the coolant exiting the heat exchanger, and closing the air inlet at least in part when the temperature of the coolant exiting the heat exchanger approaches ambient temperature.

8. The method of claim 7, wherein the coolant has a boiling point at 2 to 3 bar pressure that is 2 to 10° C. below the fuel cell operating temperature.

9. The method of claim 7, wherein the coolant is circulated through cooling channels in the fuel cell.

* * * * *